US009993951B2

(12) United States Patent
McCauley et al.

(10) Patent No.: US 9,993,951 B2
(45) Date of Patent: Jun. 12, 2018

(54) MELTING AND MOLDING DEVICE

(71) Applicant: Crayola LLC, Easton, PA (US)

(72) Inventors: James McCauley, Schnecksville, PA (US); Eric Adams, Bethlehem, PA (US); David E. Wieand, Allentown, PA (US); Eric Silvanage, Whitehall, PA (US); Christopher C. Giering, Nashville, TN (US); Matthew T. Carden, Nashville, TN (US); Eric A. King, Thompson's Station, TN (US)

(73) Assignee: Crayola, LLC, Easton, PA (US)

( * ) Notice: Subject to any disclaimer, the term of this patent is extended or adjusted under 35 U.S.C. 154(b) by 350 days.

(21) Appl. No.: 14/717,819

(22) Filed: May 20, 2015

(65) Prior Publication Data

US 2015/0336300 A1    Nov. 26, 2015

Related U.S. Application Data

(60) Provisional application No. 62/000,827, filed on May 20, 2014.

(51) Int. Cl.

| B29C 39/02 | (2006.01) |
|---|---|
| B29C 39/00 | (2006.01) |
| B29C 39/24 | (2006.01) |
| B29C 67/24 | (2006.01) |
| B29B 13/02 | (2006.01) |
| B29C 31/04 | (2006.01) |

(Continued)

(52) U.S. Cl.
CPC .......... *B29C 39/021* (2013.01); *B29B 13/022* (2013.01); *B29C 31/041* (2013.01); *B29C 39/003* (2013.01); *B29C 39/24* (2013.01); *B29C 67/241* (2013.01); *B29K 2091/00* (2013.01); *B29L 2031/725* (2013.01); *B29L 2031/772* (2013.01); *B43K 19/00* (2013.01)

(58) Field of Classification Search
CPC ... B29C 39/021; B29C 31/041; B29C 67/241; B29C 39/24; B29C 39/003; B29B 13/022; B43K 19/00; B29L 2031/725; B29L 2031/772; B29K 2091/00
USPC .............................. 264/401; 425/375, 174.4
See application file for complete search history.

(56) References Cited

U.S. PATENT DOCUMENTS

| 2004/0104509 A1* | 6/2004 | Nakada ............. B29C 45/14688 264/259 |
|---|---|---|
| 2005/0008729 A1* | 1/2005 | Fernandez ........... A63H 33/001 425/256 |

(Continued)

*Primary Examiner* — Nahida Sultana
(74) *Attorney, Agent, or Firm* — Shook, Hardy & Bacon L.L.P.

(57) ABSTRACT

A device, system, and method for creating a molded crayon body are provided. In embodiments, the device includes a receiving and positioning device having a channel for receiving a wax stick. The channel may be configured to receive and position a wax stick for melting by a melting component. The device may further include a positioning and/or adjustment component that raises and lowers a mold plate with respect to a front surface of the melting component. In some embodiments, the melting component includes a nozzle having a nozzle tip configured to transfer melted portions of the wax stick from the nozzle of the melting component to a mold on a mold plate. The mold component may also include a chilling mechanism for cooling a completed, molded crayon body.

15 Claims, 19 Drawing Sheets

(51) Int. Cl.
    *B29K 91/00*    (2006.01)
    *B29L 31/00*    (2006.01)
    *B43K 19/00*    (2006.01)

(56) References Cited

U.S. PATENT DOCUMENTS

| | | | | |
|---|---|---|---|---|
| 2005/0017411 | A1* | 1/2005 | Yang | B29C 64/106 |
| | | | | 264/319 |
| 2013/0001834 | A1* | 1/2013 | El-Siblani | B29C 67/0062 |
| | | | | 264/401 |
| 2013/0161442 | A1* | 6/2013 | Mannella | B29C 67/0055 |
| | | | | 242/598 |
| 2014/0159284 | A1* | 6/2014 | Leavitt | B29C 67/0055 |
| | | | | 264/401 |
| 2015/0130101 | A1* | 5/2015 | Fiegener | B33Y 10/00 |
| | | | | 264/40.4 |
| 2015/0145168 | A1* | 5/2015 | Rodgers | B29C 67/0055 |
| | | | | 264/308 |
| 2015/0147426 | A1* | 5/2015 | King | B29C 35/0261 |
| | | | | 425/206 |
| 2015/0266239 | A1* | 9/2015 | Okamoto | B29C 67/0081 |
| | | | | 428/413 |
| 2015/0290741 | A1* | 10/2015 | Abe | B33Y 40/00 |
| | | | | 419/28 |

* cited by examiner

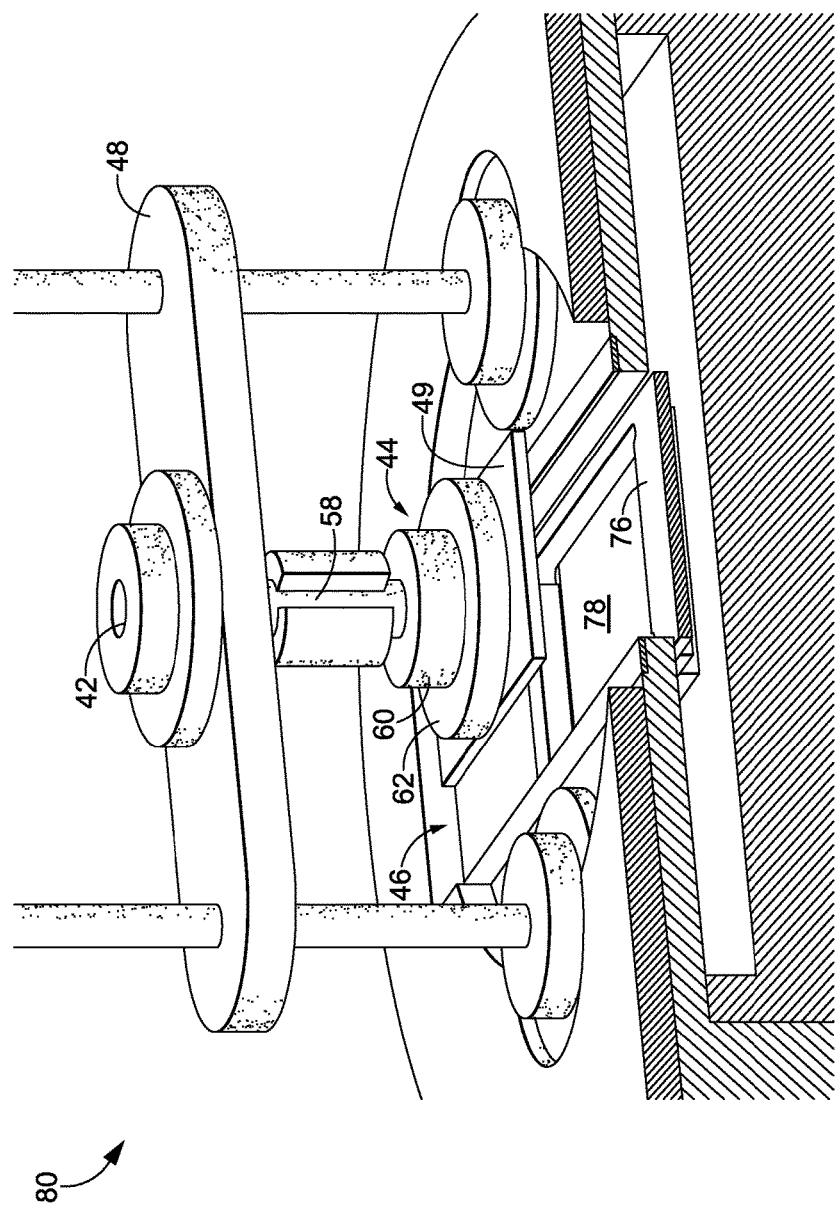

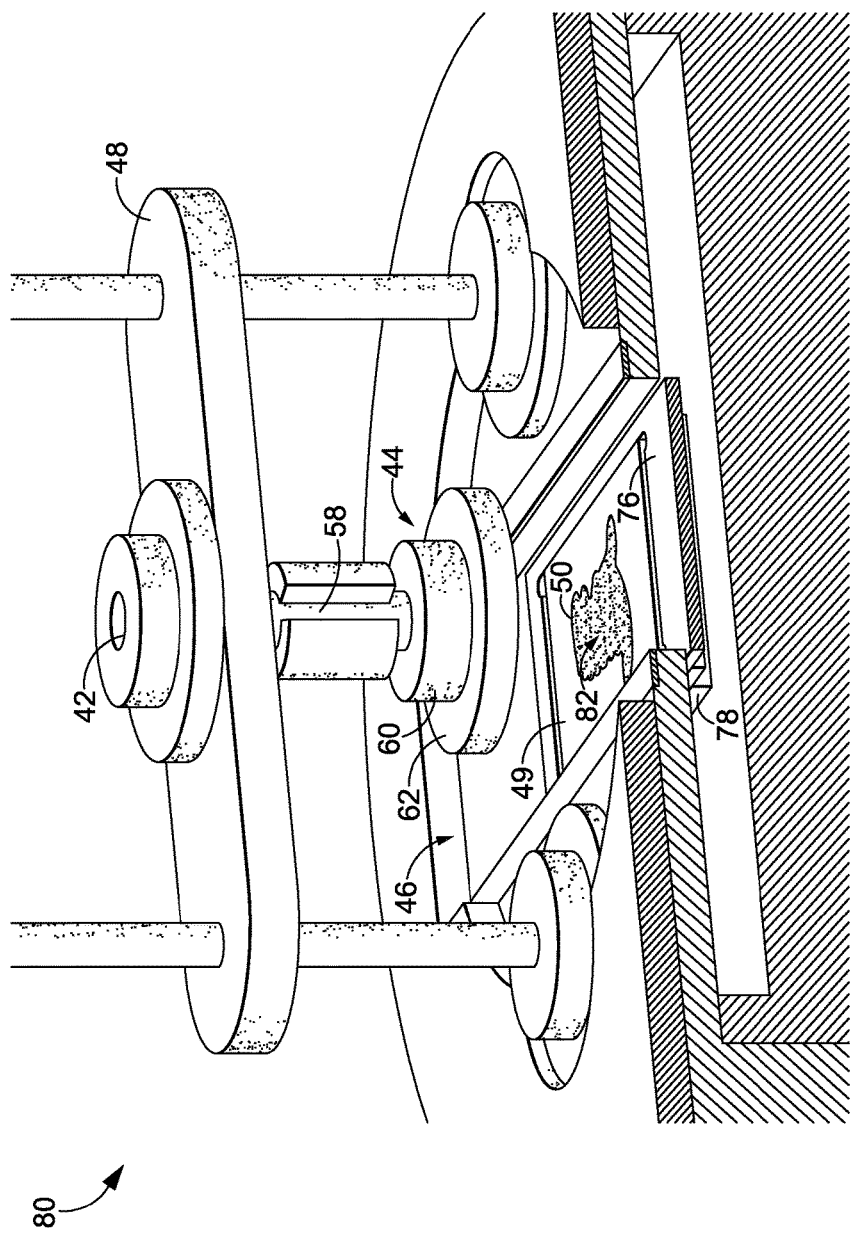

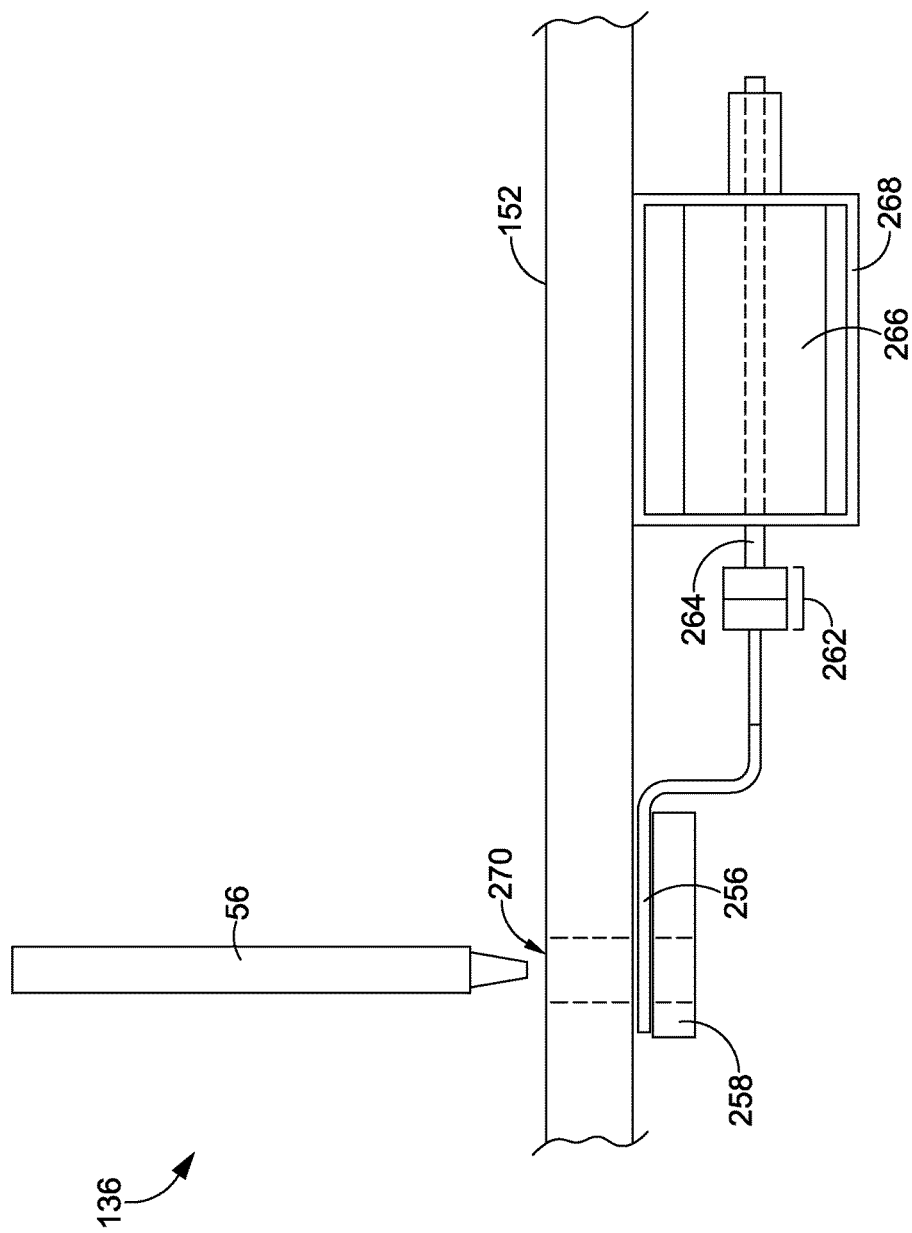

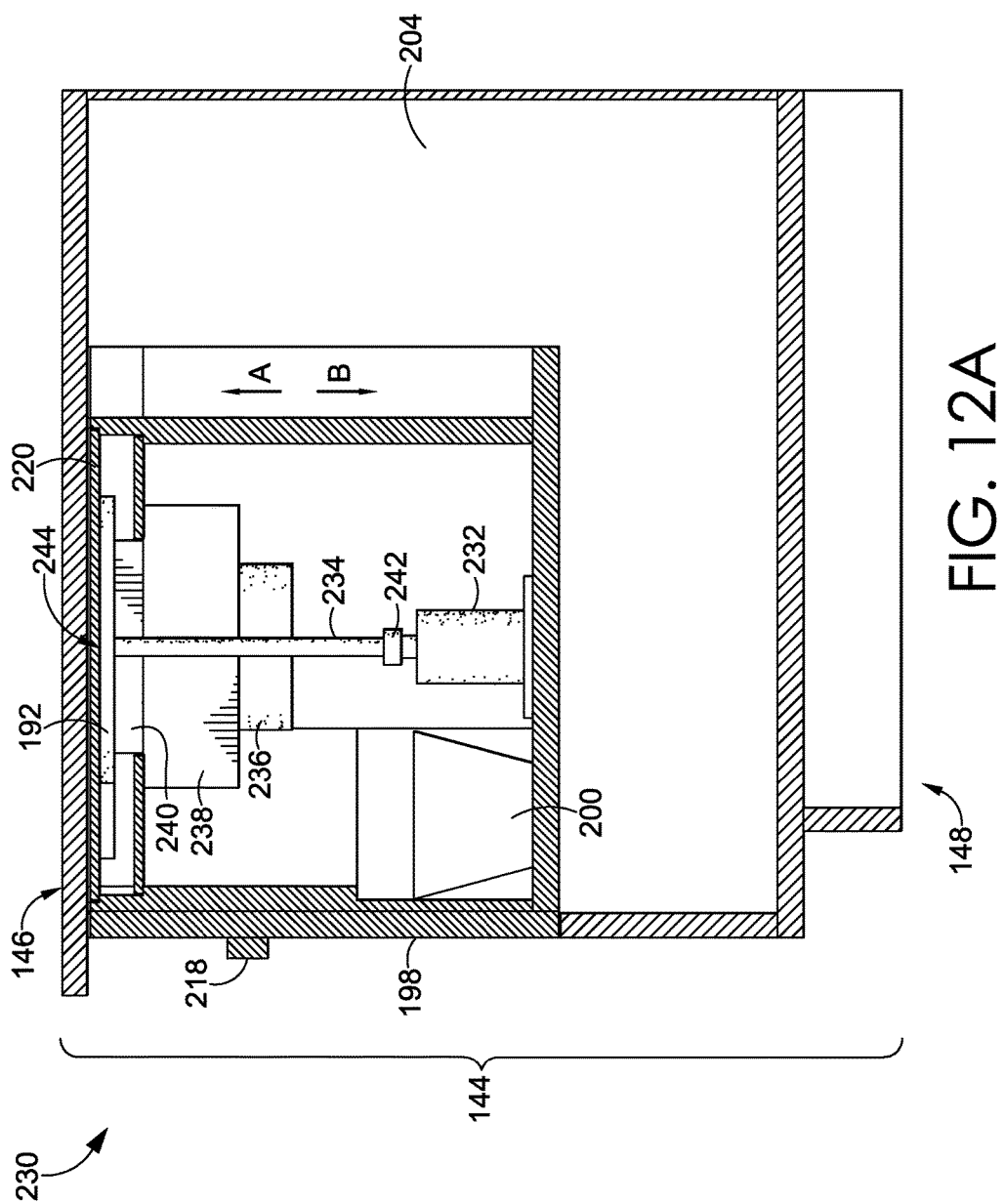

MELTING AND MOLDING DEVICE

CROSS-REFERENCE TO RELATED APPLICATION

This application claims priority to U.S. Provisional Patent Application No. 62/000,827, filed May 20, 2014, entitled "Melting and Molding Device," having the entire contents of which are hereby incorporated by reference.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed description section below. This summary is not intended to identify key features or essential features of the claimed subject matter, nor is it intended to be used as an aid in isolation to determine the scope of the claimed subject matter.

In brief and at a high level, this disclosure describes, among other things, a melting and molding device for creating a molded crayon body. The device may have a first compartment that is at least partially enclosed with respect to a user. In embodiments, the first compartment includes a receiving and positioning component having a channel configured to receive and position a wax stick, such as a crayon. The device may further include a second compartment that is substantially and/or fully enclosed with respect to the user. In embodiments, the second compartment includes a melting component having a heating element and a nozzle with a nozzle opening and a nozzle tip. The nozzle opening may be configured to receive the wax stick from the first compartment, and may further be directly aligned with the channel of the receiving and positioning component. As such, in some embodiments, the first compartment is positioned above the second compartment such that the crayon positioned by the first compartment is dropped vertically down into the second compartment nozzle.

In some embodiments, the nozzle tip may be configured to transfer melted portions of the wax stick from the nozzle to a mold plate, which may be secured in a third compartment of the device. The nozzle tip may be directly aligned with a portion of the third compartment, such as a portion of a mold integrated into the mold plate secured in the third compartment. In one embodiment, the third compartment is positioned below the second compartment, such that melted wax provided by the nozzle is dispensed vertically downward into the third compartment molding features. The third compartment may include a preheating component coupled to the mold plate, such as a motorized component for raising and lowering the mold plate into closer proximity with the preheated nozzle. As such, one or more portions of the heated nozzle may generate heat in proximity to the raised mold plate to preheat the mold surface in preparation for receiving the melted wax. Upon lowering the mold plate, the preheated mold may receive the melted portions of the wax stick for subsequent cooling. Embodiments of the third compartment include a cooling feature for accelerating the cooling of the mold having received the melted wax. In one aspect, the cooling feature includes a chill plate and/or fan feature adjacent to the mold plate.

In further embodiments of the invention, the nozzle of the second compartment may include a thermocouple device for monitoring a temperature of the nozzle. As such, the nozzle may be heated to a particular temperature and/or to a temperature within a particular range. Once the nozzle is heated to a particular temperature and/or temperature range, the wax stick may be lowered into the nozzle opening for melting, according to one embodiment. In one aspect, a travel stop and/or trap door feature may control travel/dropping of the wax stick from the receiving and positioning component to the nozzle opening. The control of such travel may be dependent upon the thermocouple-monitored temperature of the nozzle, such that the wax stick may remain in the first chamber until the nozzle is preheated to a predetermined temperature and/or temperature range. In further embodiments, a control component coupled to the melting and molding device may monitor, track, and/or control the timing of one or more of the preheating and processing features to ensure that the melted wax is processed according to one or more predetermined specifications.

In another embodiment of the invention, the mold plate and/or mold secured by the mold holder plate may include a thermocouple device for monitoring the temperature of the mold surface receiving the melted wax. As such, the mold may be heated to a particular temperature and/or to a temperature range, before the wax stick is melted and deposited onto the mold surface. As will be understood, a mold surface may include any contact surface, surface feature, surface characteristic, and/or mold part that is configured to receive melted portions of the wax stick. Upon receiving the melted portions of the wax stick, the preheated mold may be temperature monitored via the thermocouple device to determine whether the resulting molded crayon body has cooled to a threshold temperature based on the surrounding mold temperature. For example, a control component coupled to the melting and molding device may monitor, track, and/or control the timing of one or more preheating and processing features to ensure the melted wax is molded according to a one or more predetermined specifications.

While monitoring the overall melting and molding process, one or more prompts may be displayed on a user display device having a screen that depicts one or more images associated with the melting and molding process. In one aspect, an entertainment portion of a picture and/or video segment may be presented to a user while the stick is melting and/or while the molded crayon body is cooling to a requisite temperature before the user is permitted access to the molded product. For example, a video describing the melting and molding process may be displayed to the user once the wax stick is inserted into the crayon receiving and positioning component and the cover and/or door on the receiving and positioning component is closed, thereby indicating that the system may begin melting and molding the desired product.

DESCRIPTION OF THE DRAWINGS

Illustrative embodiments of the invention are described in detail below with reference to the attached drawing figures, and wherein:

FIG. 6A is an enlarged, perspective view of portions of second and third compartments of a melting and molding device, with a mold plate in a raised, preheating position, in accordance with an embodiment of the invention;

FIG. 6C is an enlarged, perspective view of second and third compartments of a melting and molding device, with a mold plate in a lowered, cooling position, in accordance with an embodiment of the invention;

FIG. 11B is an enlarged, perspective view of portions of the melting and molding device including one example of a travel stop feature for variably controlling the travel of a wax stick, in accordance with an embodiment of the invention;

FIG. 12A is a cross-sectional side view of a bottom chamber of a melting and molding device, with a mold plate in a lowered position, in accordance with an embodiment of the invention;

DETAILED DESCRIPTION

Figure 1:
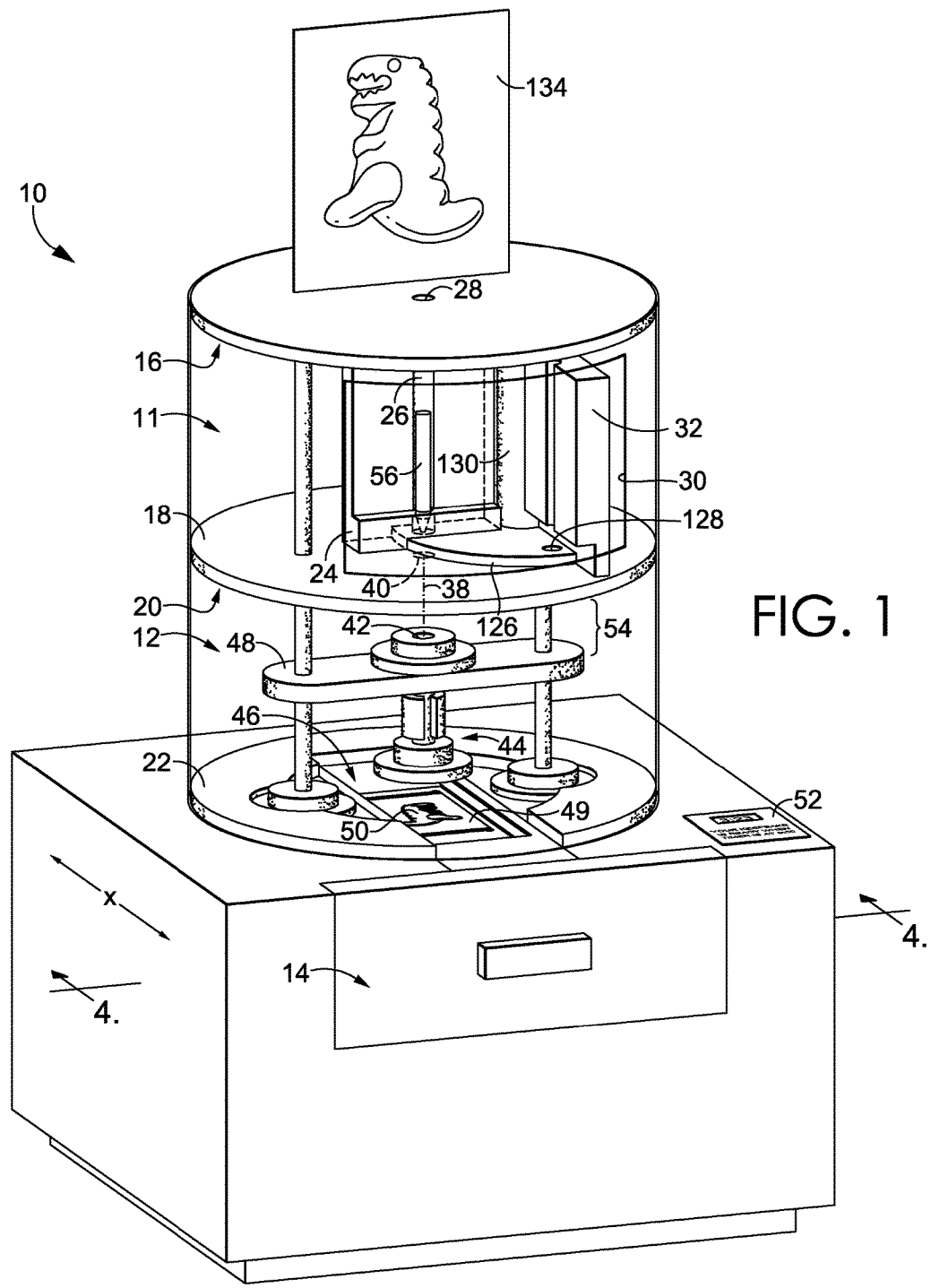
FIG. 1 is a front, perspective view of a melting and molding device, in accordance with an embodiment of the invention.

The subject matter of select embodiments of the invention is described with specificity herein to meet statutory requirements. But the description itself is not intended to necessarily limit the scope of the claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

Embodiments of the invention include a melting and molding device for creating a molded crayon body. The device may have a first compartment that is at least partially enclosed with respect to a user. In embodiments, the first compartment includes a receiving and positioning component having a channel configured to receive and position a wax stick, such as a crayon. The device may further include a second compartment that is substantially and/or fully enclosed with respect to the user. In embodiments, the second compartment includes a melting component having a heating element and a nozzle with a nozzle opening and a nozzle tip. The nozzle opening may be configured to receive the wax stick from the first compartment, and may further be directly aligned with the channel of the receiving and positioning component. As such, in some embodiments, the first compartment is positioned above the second compartment such that the crayon positioned by the first compartment is dropped vertically down into the second compartment nozzle.

In some embodiments, the nozzle tip may be configured to transfer melted portions of the wax stick from the nozzle to a mold plate, which may be secured in a third compartment of the device. The nozzle tip may be directly aligned with a portion of the third compartment, such as a portion of a mold integrated into the mold plate secured in the third compartment. In one embodiment, the third compartment is positioned below the second compartment, such that melted wax provided by the nozzle is dispensed vertically downward into the third compartment molding features. The third compartment may include a preheating component coupled to the mold plate, such as a motorized component for raising and lowering the mold plate into closer proximity with the preheated nozzle. As such, one or more portions of the heated nozzle may generate heat in proximity to the raised mold plate to preheat the mold surface in preparation for receiving the melted wax. Upon lowering the mold plate, the preheated mold may receive the melted portions of the wax stick for subsequent cooling. Embodiments of the third compartment include a cooling feature for accelerating the cooling of the mold having received the melted wax. In one aspect, the cooling feature includes a chill plate and/or fan feature adjacent to the mold plate.

In further embodiments of the invention, the nozzle of the second compartment may include a thermocouple device for monitoring a temperature of the nozzle. As such, the nozzle may be heated to a particular temperature and/or to a temperature within a particular range. Once the nozzle is heated to a particular temperature and/or temperature range, the wax stick may be lowered into the nozzle opening for melting, according to one embodiment. In one aspect, a travel stop and/or trap door feature may control travel/dropping of the wax stick from the receiving and positioning component to the nozzle opening. The control of such travel may be dependent upon the thermocouple-monitored temperature of the nozzle, such that the wax stick may remain in the first chamber until the nozzle is preheated to a predetermined temperature and/or temperature range. In further embodiments, a control component coupled to the melting and molding device may monitor, track, and/or control the timing of one or more of the preheating and processing features to ensure that the melted wax is processed according to one or more predetermined specifications.

In another embodiment of the invention, the mold plate and/or mold secured by the mold holder plate may include a thermocouple device for monitoring the temperature of the mold surface receiving the melted wax. As such, the mold may be heated to a particular temperature and/or to a temperature range, before the wax stick is melted and deposited onto the mold surface. As will be understood, a mold surface may include any contact surface, surface feature, surface characteristic, and/or mold part that is configured to receive melted portions of the wax stick. Upon receiving the melted portions of the wax stick, the preheated mold may be temperature monitored via the thermocouple device to determine whether the resulting molded crayon body has cooled to a threshold temperature based on the surrounding mold temperature. For example, a control component coupled to the melting and molding device may monitor, track, and/or control the timing of one or more preheating and processing features to ensure the melted wax is molded according to a one or more predetermined specifications.

While monitoring the overall melting and molding process, one or more prompts may be displayed on a user display device having a screen that depicts one or more images associated with the melting and molding process. In one aspect, an entertainment portion of a picture and/or video segment may be presented to a user while the wax stick is melting and/or while the molded crayon body is cooling to a requisite temperature before the user is permitted access to the molded product. For example, a video describing the melting and molding process may be displayed to the user once the wax stick is inserted into the crayon receiving and positioning component and the cover and/or door on the receiving and positioning component is closed, thereby indicating that the system may begin melting and molding the desired product.

In further embodiments, a system for creating a molded crayon body is provided. The system may include a receiving and positioning component for receiving and positioning one or more wax sticks. The system may further include a melting component for melting the one or more wax sticks to provide melted portions of the one or more wax sticks. Additionally, a preheating component may be included in the system. The preheating component may be used for preheating a mold of a mold plate, which receives the melted portions of the one or more wax sticks.

In yet another embodiment, a method for creating a molded crayon body is provided. The method may include receiving a wax stick at a receiving and positioning component. The wax stick may then be transferred from the receiving and positioning component to a melting component. At the melting component, the wax stick may be melted to produce one or more melted portions of the wax stick. The method may further include receiving the one or more melted portions of the wax stick at a molding component. Finally, the method may include preheating the molding component that receives the one or more melted portions of the wax stick and/or cooling the received, melted portions of the wax stick to provide a finished, molded crayon body.

With reference now to the figures, devices, systems, and methods for creating a molded crayon body are described in accordance with embodiments of the invention. Various embodiments are described with respect to the figures in which like elements are depicted with like reference numerals.

Turning first to FIG. 1, a front, perspective view of an exemplary melting and molding device ("the device") 10 is illustrated, where the device 10 includes a first compartment 11, a second compartment 12, and a third compartment 14, with the third compartment 14 depicted in a closed position. In embodiments, the first compartment 11 may include a receiving and positioning component 24 for receiving and positioning a wax stick 56, such as an unwrapped crayon body (e.g., a Crayola® crayon), for transfer to the second compartment 12. In further embodiments, the second compartment 12 may include a melting component 44 for receiving and melting the wax stick 56, in order to provide melted portions of the wax stick 56, such as, for example, droplets of melted wax. Such melted portions of the wax stick 56 may then drip from the melting component 44 of the second compartment 12 onto the mold plate 49 of the third compartment 14. As will be discussed in more detail with respect to FIGS. 6A-6C, the third compartment 14 may include a preheating component configured to raise and lower the mold plate 49 for preheating of a mold 50 that receives the melted portions of the wax stick 56. Embodiments of each compartment, and the components that may be included therein, are described in greater detail below.

As shown in the example of FIG. 1, a wax stick 56 is positioned in the channel 26 of the receiving and positioning component 24 with a tip of the wax stick 56 pointing in a downward direction. In embodiments, the first compartment 11 is partially enclosed with respect to a user, such that the interior of the first compartment 11 is accessible to the user through a first compartment opening 30. As mentioned, the first compartment 11 may include a receiving and positioning component 24. The receiving and positioning component 24 may have a channel 26 that is configured to receive and position a wax stick 56. In embodiments, the channel 26 is accessible via a repositionable cover 32 associated with the receiving and positioning component 24. The cover 32 may be opened by a user, in order for the user to provide a wax stick 56 to the channel 26. In embodiments, the cover 32 may be a hinged cover, a slidable cover, a rollaway cover, or any other cover that may be repositioned between at least a first position and a second position, where the first position allows a user to access the channel 26 and the second position prevents the user from accessing the channel 26. In embodiments, the cover 32 includes a handle 34 (shown in FIG. 3) that may be used to open and close the cover 32. Thus, the first compartment 11 may be configured to allow a user to reach through the first compartment opening 30 and open the cover 32 in order to access the channel 26.

Figure 3:
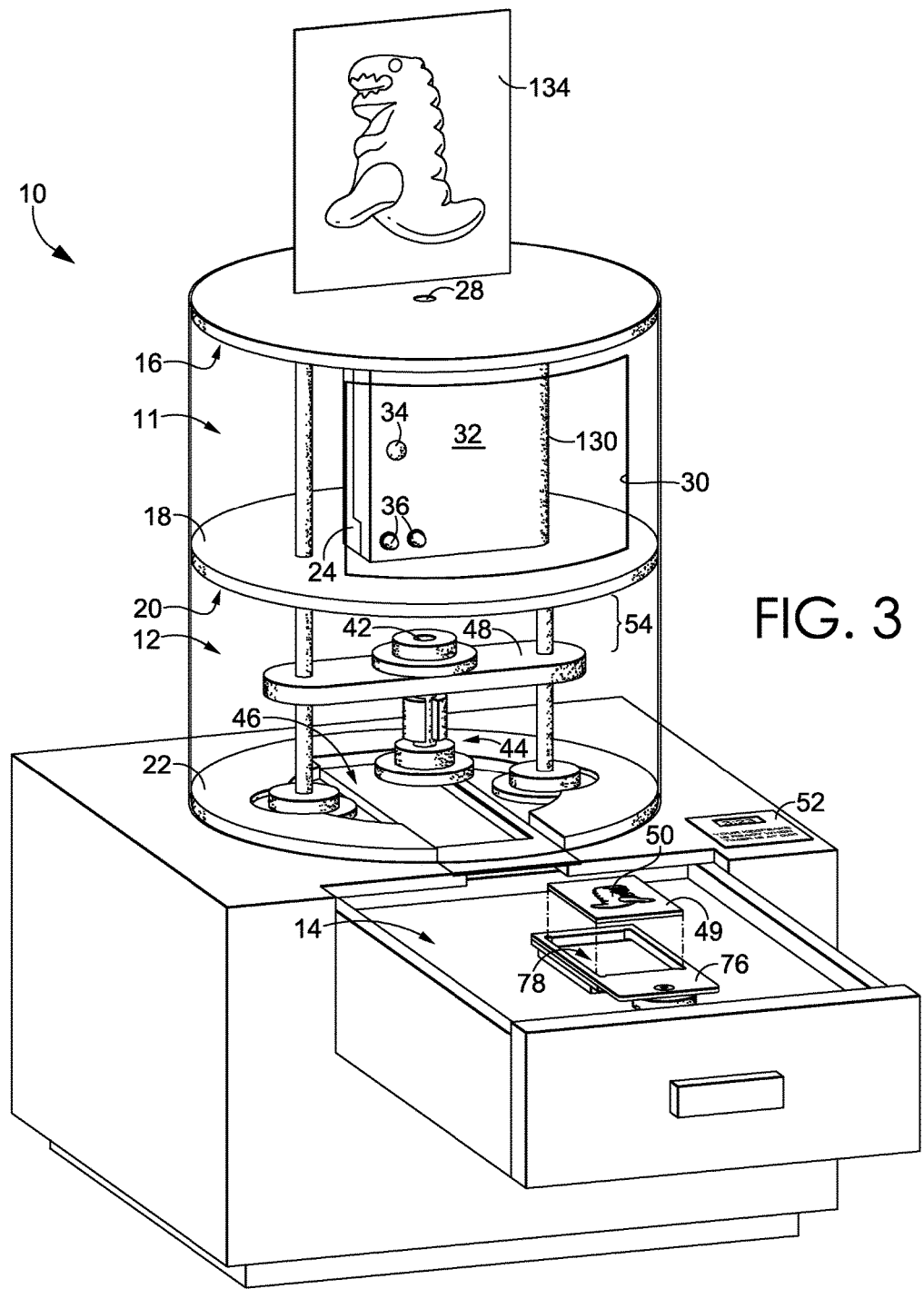
FIG. 3 is a front, perspective view of a melting and molding device, with a third compartment of the device in an open position and an exploded view of the components included in the third compartment, in accordance with an embodiment of the invention.

As shown in FIG. 3, a first lighting component 36 may, in embodiments, be configured to indicate a state of the cover 32. In some embodiments, the state of the cover 32 may include a locked state and an unlocked state. For example, if the device 10 is ready for a user to provide a wax stick 56 at the receiving and positioning component 24, the first lighting component 36 may display a green light, indicating that the cover 32 is unlocked and/or that a user is permitted to access the channel 26. After the user provides the wax stick 56 to the receiving and positioning component 24, and the device 10 begins to process the wax stick 56 according to the melting and molding process described herein, a lock on the covering component 32 might engage in order to prevent a user from opening the covering component 32 during such processing. In this example, the first lighting component 36 may display a red light to indicate that the covering component 32 is locked. In embodiments, the covering component 32 may remain locked, and accordingly, the first lighting component 36 may continue to display a red light until the current cycle of the melting and molding process is complete. In one embodiment, when the current cycle is complete and when the device 10 is once again ready for a user to provide a wax stick 56 to the receiving and positioning component 24, the lock on the cover 32 may be disengaged, and the first lighting component 36 may once again display a green light (or other corresponding identifier) to indicate that the cover 32 is unlocked. Such locking and lighting may be coordinated via an electromagnetic lock component. For example, when the cover 32 is shut, an electromagnet may contact an electromagnetic sensor, such as a Hamlin #59135-010 magnetic sensor, thereby completing a circuit and causing a lock on the cover 32 to engage and a red light to be displayed at the first lighting component 36.

In embodiments, a covering component 32 may be coupled to a pivoting column 130. The covering component 32 and the pivoting column 130 may be adjacent and/or directly adjacent to the receiving and positioning component 24. In embodiments, the pivoting column 130 is separated from the receiving and positioning component 24 by a predefined amount of space. In embodiments, the pivoting column 130 and the covering component 32 coupled thereto may be rotatably repositioned with respect to the receiving and positioning component 24. For example, the covering component 32 may be rotatably repositionable about an axis y. In embodiments, the axis y corresponds to a central longitudinal axis running through a center of the pivoting column 130. The covering component 32 may be rotatably repositioned between at least a first and second position, corresponding to an open and closed position, respectively. For example, FIG. 1 illustrates the covering component 32 in an open position, such that a wax stick 56 may be provided to the channel 26 of the receiving and positioning component 24. In embodiments, when the covering component 32 is in a closed position, such as the closed position depicted in FIG. 3, the covering component 32 is directly adjacent to the receiving and positioning component 24. In further embodiments, in a closed position, the covering component 32 is parallel to a surface of the receiving and positioning component 24.

In embodiments of the invention, the pivoting column 130 and/or the covering component 32 may further be coupled to a drop plate 126, which may also be rotatably repositionable with respect to the receiving and positioning component 24. For example, if the drop plate 126 is coupled to the covering component 32, then as the covering component 32 is rotated about the axis y (i.e., the axis of the pivoting column 130), the drop plate 126 will also rotate about the axis y. As illustrated in FIG. 1, the drop plate 126 is arc shaped, in one embodiment.

In further embodiments, the drop plate 126 facilitates a timing of the transfer of the wax stick 56 from the first compartment 11 to the second compartment 12. For example, the drop plate 126 may include a drop plate opening 128. As the covering component 32 is rotated about the pivot point of the pivoting column 130 (i.e., the axis y), the drop plate 126, and consequently the drop plate opening 128, may also rotate about the axis y. In some embodiments, the drop plate opening 128 may be configured such that when the covering component 32 is in a closed position (e.g., FIG. 3), the drop plate opening 128 is directly aligned with the channel 26 and the channel opening 40, thereby allowing the wax stick 56 to be transferred out of the channel 26 and into the second compartment 12 of the device 10. In further embodiments, when the covering component 32 is in an open position, however, as illustrated in FIG. 1, a portion of the drop plate 126 may obstruct the channel opening 40, thereby preventing the transfer of the wax stick 56. In this way, the drop plate 126 may act as a release mechanism, in embodiments, preventing the transfer of the wax stick 56 from the first compartment 11 to the second compartment 12 when the covering component 32 is in an open position, while allowing the transfer of the wax stick 56 when the covering component 32 is in a closed position. As such, a user may reposition the covering component 32 to an open position, thereby closing access to the channel opening 40, and then provide the wax stick 56 to the channel 26.

Figure 5A:
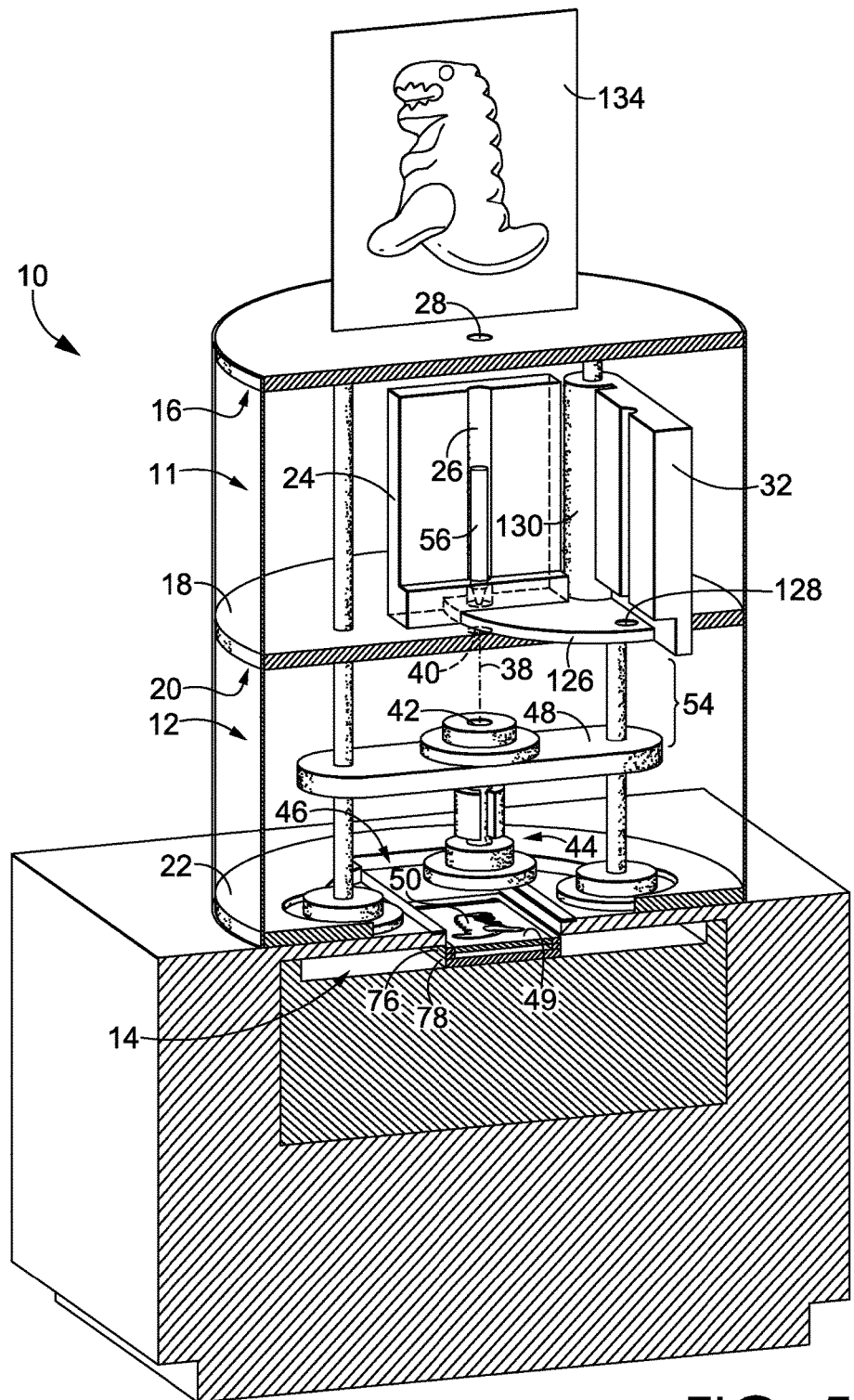
FIG. 5A is a cross-sectional view of a melting and molding device, with a cover on a receiving and positioning component in an open position, in accordance with an embodiment of the invention.
Figure 5B:
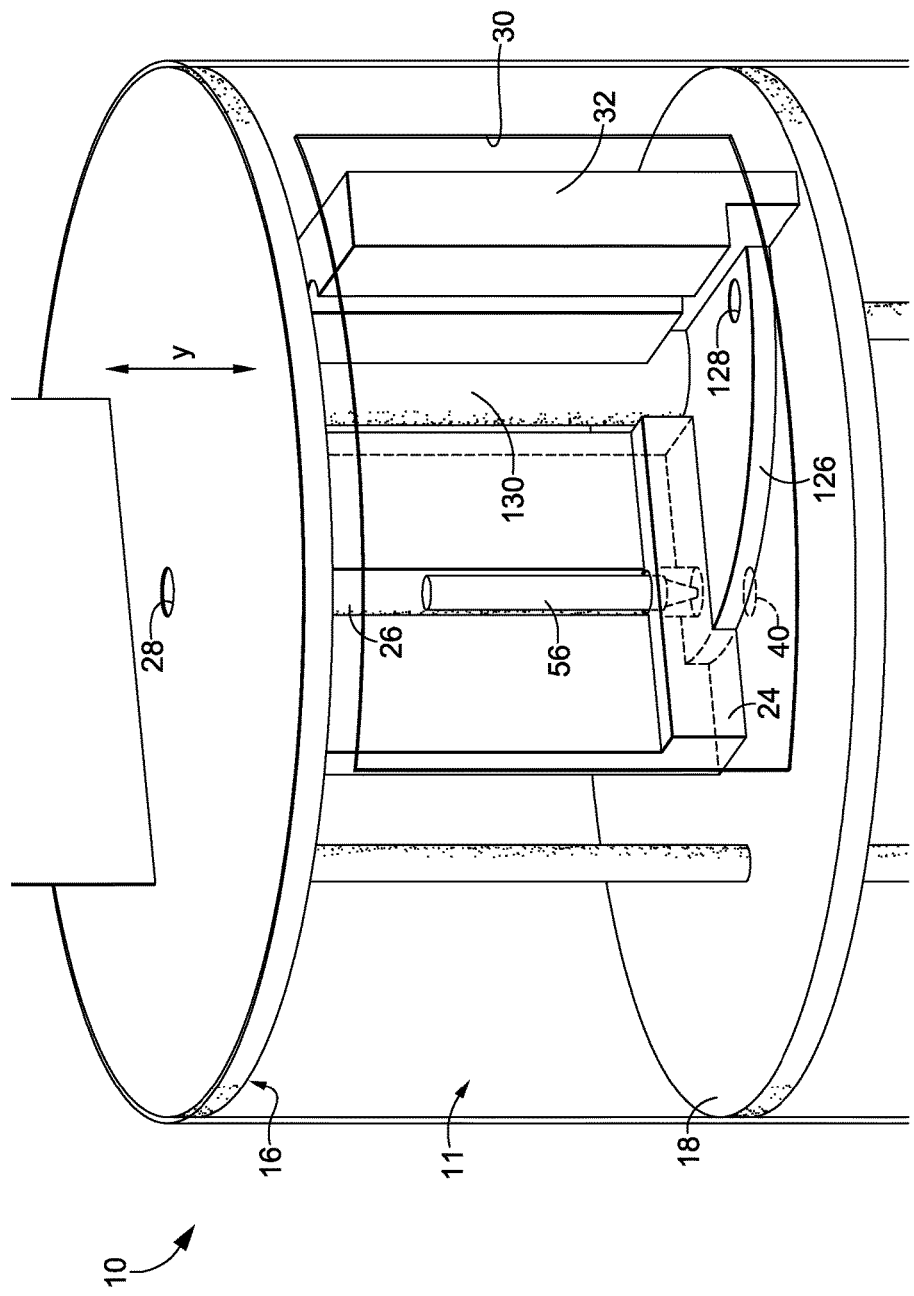
FIG. 5B is an enlarged, perspective view of a first compartment of a melting and molding device, with a cover on a receiving and positioning component in an open position, in accordance with an embodiment of the invention.

In embodiments, a tip of the wax stick 56 may rest on the drop plate 126 as long as the covering component 32 is in an open position, as illustrated in FIG. 1. Then, upon repositioning the covering component 32 to a closed position, and thereby causing the drop plate opening 128 to be directly aligned with the channel 26 and the channel opening 40, the wax stick 56 may be transferred from the channel 26 to the melting component 44, as shown in the closed position of FIG. 3. As such, with reference to FIG. 5A, covering component 32 is in an open position, with drop plate 126 pivoted into a blocking position, preventing the wax stick 56 from passing into the second compartment 12. As shown in the enlarged view of FIG. 5B, channel opening 40 is obstructed by the drop plate 126 such that channel 26 is separated from channel opening 40.

While FIGS. 1 and 3 illustrate a rotatable, repositionable covering component 32 and drop plate 126, it should be understood that in further embodiments, the covering component 32 and/or the drop plate 126 may be slidably repositionable, repositionable via hinges, or any other configuration that allows the covering component 32 and/or the drop plate 126 to be repositioned between at least a first position and a second position, where the first position allows a user to access the channel 26 (but prevents the wax stick 56 from falling through the channel opening 40) and the second position prevents the user from accessing the channel 26 (but allows the wax stick 56 to pass through the channel opening 40).

In embodiments, the first lighting component 36 includes one or more lighting elements, such as the two lighting elements illustrated in FIG. 3. The lighting elements may correspond to different colors of lights. In further embodiments, a single lighting element may be included in the first lighting component 36. The single lighting element may display multiple colors. Additionally or alternatively, the single lighting element might not display different colors. For example, the single lighting element may be lit to indicate a locked or unlocked state and unlit to indicate the opposite state. In any of these embodiments, the lighting element may be an LED light or any other type of lighting element suitable for illuminating at least a portion of the first lighting component 36.

In embodiments of the invention, after a wax stick 56 has been provided to the channel 26, the wax stick 56 may be transferred, through the channel opening 40, to the second compartment 12. This transfer from the first compartment 11 to the second compartment 12 may be achieved in a variety of manners. In embodiments, the wax stick 56 is pulled downward by gravity. In further embodiments, the receiving and positioning component 24 may include a release mechanism. Such a release mechanism might obstruct the channel opening 40 when the cover 32 is in an open position. Then, when the cover 32 is in a closed position, the release mechanism may cause such obstruction to be removed from the channel opening 40, thereby allowing the transfer of the wax stick 56 from the channel 26 via the channel opening 40. Additionally or alternatively, the receiving and positioning component 24 may include an advancing mechanism that mechanically advances a wax stick 56 from the channel 26 to a desired location in the second compartment 12.

The second compartment 12 may include a melting component 44. In embodiments, the melting component 44 is suspended at a position within the second compartment 12 by a support element 48. The melting component 44 may include a nozzle having a nozzle opening 42 and a nozzle tip 66 having a nozzle tip opening, as depicted in the exemplary cross-sectional view of a melting component 44. In embodiments, the melting component 44 includes an aluminum drip nozzle. The exemplary melting component and nozzle of FIG. 2 includes various nozzle features as described with reference to FIG. 1. As shown, embodiments of the melting component 44 include a nozzle opening 42 configured to receive a wax stick 56 at the nozzle opening 42. In some embodiments, a length of the melting component 44 and/or nozzle is configured to receive the entire wax stick 56. In further embodiments, the length of the nozzle is configured to receive only a portion of the wax stick 56 at one time, such that an upper portion 72 of the wax stick 56 remains outside of the nozzle until a lower portion 70 of the wax stick 56 melts. In this way, a user may view the progression of the wax stick 56 through the melting component 44 as portions of the wax stick 56 become melted. In embodiments, the melting component 44 may further include a nozzle tip 66 associated with a nozzle front 64 end of the melting component 44. In embodiments, the nozzle tip 66 may be configured to transfer melted portions of the wax stick 56 out of the melting component 44. In some embodiments, the nozzle tip 66 is aligned with one or more features of the third compartment 14. In further embodiments, the nozzle tip 66 may be a removable tip, which is discussed in more detail below.

Returning to the embodiments of FIG. 1, the nozzle opening 42 may be directly aligned with the channel 26 such that a wax stick 56 may pass through the channel opening 40, travel along a path 38 based on a gravitational pull, and be received by the nozzle opening 42. Such direct alignment may ensure a successful transfer of a wax stick 56 from the channel 26 to the nozzle opening 42 by gravitational force. A size of the nozzle opening 42 may be optimized to account for variations between the actual path traveled by the wax stick 56 and the orientation and/or alignment associated with the path 38. For example, common variations in the actual path traveled may be caused by a size, weight, and/or center of gravity of a wax stick 56. As such, a size and/or location of the nozzle opening 42 may be adjusted to account for such variations. Additionally or alternatively, portions of the melting component 44 and/or the nozzle may be tapered such that a portion of the nozzle features near the nozzle opening 42 are larger than a portion of the nozzle near the nozzle front 64.

Furthermore, in some embodiments, such variations may be minimized by optimizing a distance between the channel opening 40 and the nozzle opening 42. For example, the distance between the channel opening 40 and the nozzle opening 42 may be based on a standard length of a wax stick 56 provided for use with the device 10. If such distance is approximately the same as the standard length of a wax stick 56, then an amount of time associated with a free fall of the wax stick 56 from the channel opening 40 to the nozzle opening 42 may be reduced and/or eliminated, such that there is little opportunity for the actual path traveled by the wax stick 56 to vary from the path 38. Thus, in embodiments, the distance between the channel opening 40 and the nozzle opening 42 is slightly less than the standard length of a wax stick 56. In further embodiments, the channel opening 40 may be directly adjacent to the nozzle opening 42, such as by positioning the nozzle melting component 44 and/or nozzle directly adjacent to the top surface 20 of the second compartment 12.

Variations in the actual path traveled by the wax stick 56 may also be minimized by tapering at least a portion of the channel 26. For example, a portion of the channel 26 exposed to a user may be sufficiently large for a user, including a small child, to easily place the wax stick 56 in the channel 26, while a lower portion of the channel 26 may be tapered, such that the lower portion is approximately the same size as the wax stick 56. Such tapering may aid in precisely positioning the wax stick 56 for transfer to the nozzle opening 42.

In embodiments, the melting component 44 may further include a heating element that provides heat sufficient to melt the wax stick 56 into one or more melted portions of the wax stick 56. As further shown in FIG. 2, embodiments of the melting component 44 include a first portion 58, a second portion 60, and a third portion 62, which may be configured to collectively conduct heat for melting of the wax stick 56 into melted portions for dripping through the melting component 44. Such melted portions of the wax stick 56 may pass through a tip 66 of the nozzle front 64 prior to transfer of the melted portions of the wax stick 56 from the second compartment 12 to the third compartment 14. For example, the wax stick 56 may be received as a solid wax stick 56 at the nozzle opening 42 and, after processing at the melting component 44, may be transferred from the nozzle front 64 of the melting component 44 nozzle, as melted portions of the wax stick 56, such as droplets of melted wax, to the third compartment 14 through the second compartment opening 46 in the bottom surface 22 of the second compartment 12.

In embodiments, the melting component 44 includes one or more features for heating a wax stick 56 along the path 38, such as a heating collar and/or a band heater that is positioned directly adjacent to the nozzle. For example, the heating element may be a high-temperature heating nozzle band heater, such as a mica-insulated band heater and/or a mineral-insulated band heater. Such a heating collar and/or band heater may surround an outer surface of the nozzle, such that the heating collar and/or band heater is coupled to the outer surface of melting component 44, and transfers heat through the outer surface of the nozzle to the interior 74 of the nozzle where the wax stick 56 is positioned. The heating collar and/or band heater may wrap around the nozzle, which is characterized by a cylindrical configuration in some embodiments.

The configuration of the heating element(s) of the melting component 44 may, in some embodiments, provide optimization of one or more features of the invention. For example, it may be undesirable to allow the wax stick 56 to remain in contact with a heat source for a prolonged period of time. Such prolonged contact may cause the wax to burn, potentially creating an unpleasant odor, a buildup of residue, and/or a safety hazard. In embodiments, because the wax stick 56 may immediately begin melting and dripping from the nozzle tip 66, the risk of overheating and/or burning the wax stick 56 is minimized. In embodiments, this immediate melting may also expedite a user's experience and reduce wait times for subsequent users. Additionally, embodiments of the melting component 44 nozzle may include a diffusing element, such as a diffuser that retains unmelted portions of the wax stick 56 in the nozzle of the melting component 44 while allowing melted portions of the wax stick 56 to pass through the nozzle tip 66. In this way, the diffusing element may prevent solid shards and/or pieces of the unmelted wax stick from passing through the nozzle tip 66. The diffusing element may thus avoid prolonged contact between the heated portions of the interior 74 of the nozzle and the melted portions of the wax stick 56 and, at the same time, ensure that the unmelted portions of the wax stick 56 remain within the nozzle melting component 44 for a period of time sufficient for completed melting.

The nozzle tip 66 of the nozzle melting component 44 may be removable, in embodiments. Additionally or alternatively, a removable nipple may be associated with the nozzle tip 66. In one embodiment, the removable tip and/or removable nipple may be positioned at a portion of the nozzle melting component 44 corresponding to the last area of contact between the melted portions of the wax stick 56 and the interior 74. In other words, the removable tip and/or removable nipple may be positioned at a portion of the nozzle that is most susceptible to the buildup of cooled wax. In embodiments, because the removable tip and/or removable nipple may be removed, a maintenance operator may easily remove the removable tip and/or removable nipple for cleaning and/or replacement by a clean tip and/or nipple. In one embodiment, the removable tip and/or removable nipple may further be a disposable tip and/or disposable nipple, such that they may be easily removed, disposed, and replaced by a new, clean nipple. Upon removing the removable tip and/or nipple, a maintenance operator may easily clean the other surfaces with which the wax stick 56, including melted portions of the wax stick, comes into contact. For example, a cleaning tool, such as a cleaning rod with wire bristles, may be inserted at an access point 28 in the top surface 16 of the first compartment 11. Such cleaning tool may reach all the way through the channel 26, out the channel opening 40, into the nozzle opening 42, and all the way through the nozzle of melting component 44. Because each of these items may be directly aligned with one another, a single cleaning tool may be used to simultaneously clean all items. In further embodiments, access to one or more portions of the device 10 may be initiated via one or more features of the device 10, such as through the access point 28.

Continuing with respect to the melting component 44, embodiments of the melting component 44 may be operatively coupled to a melting control component that includes a temperature measuring device, such as a thermocouple (e.g., ProSense® THMJ-B01L06-01), and that controls, among other things, the temperature of the heating element associated with the melting component 44. As such, the heating element may include the first portion 58, the second portion 60, and the third portion 62, which are configured to thoroughly heat the body of the melting component 44, for melting a wax stick 56 within the interior 74. In embodiments, the melting control component includes a rheostat, such as a Lutron® t-1000 rheostat, for controlling a temperature of the heating element portions 58, 60, and 62, and thereby controlling a temperature at the nozzle melting component 44. In further embodiments, the melting control component includes a temperature controller, such as a SOLO® SL4824-VR, for controlling a temperature of the heating element, and thereby controlling a temperature at the melting component 44. The rheostat and/or temperature controller may allow the temperature to be adjusted up or down until an optimized and/or desired temperature for melting a wax stick 56 is achieved. For example, the thermocouples may measure a temperature at the melting component 44 nozzle, and in response, the rheostat and/or temperature controller may be used to increase or decrease the temperature of the heating element (first, second, and third portions 58, 60, and 62) to maintain a desired temperature at the nozzle of melting component 44. In embodiments, the temperature at the heating element and/or the nozzle is maintained at a particular temperature, such as a temperature maintained at 230 degrees Fahrenheit. In further embodiments, the heating element may remain in an active state between uses, such that an attempt is made to maintain the heating element at a fixed temperature for a time period covering multiple uses. Additionally or alternatively, a temperature at the heating element may be reduced between uses in order to, among other things, save energy. Such temperature adjustments may be made manually at the rheostat, temperature controller, and/or other melting control component. Additionally or alternatively, such temperature adjustments may be made automatically according to a program for controlling the rheostat, temperature controller, and/or other melting control component. In embodiments, this temperature control system/method may be useful in preventing the overheating and/or burning of wax, as well as the associated unpleasant odor, buildup of residue, and/or safety hazards.

As mentioned, embodiments of the heating element (first portion 58, second portion 60, and third portion 62) provide heat sufficient to melt wax sticks 56. Thus, the heat provided at the melting component 44 could cause injury, such as a burn injury, if a user contacts the melting component 44. To avoid such injury, the second compartment 12, which includes the melting component 44, may be substantially and/or fully enclosed with respect to a user. Unlike the first compartment 11, which may include a first compartment opening 30 permitting user access to the receiving and positioning component 24, the second compartment 12, including the melting component 44 therein, may be configured such that the interior of the second compartment 12 is substantially inaccessible to a user. As will be discussed in greater detail below, the second compartment 12 may include a second compartment opening 46, but this second compartment opening 46 is not configured to permit user access to the interior of the second compartment 12. Unlike the first compartment opening 30, a user is unable to reach through the second compartment opening 46, because the second compartment opening 46 is not accessible and/or exposed to the user. Thus, the second compartment 12 is substantially inaccessible to a user, or in other words, the second compartment 12 is substantially and/or fully enclosed with respect to a user, as the second compartment opening 46 substantially precludes user access to the second compartment 12. In embodiments, the second compartment 12 may include additional openings, such as perforations, while still substantially precluding user access to the second compartment 12.

In order to further promote user safety, the melting component 44 may, in embodiments, be separated from the bottom surface 18 of the first compartment 11 by at least a threshold distance, such as the distance 54. In embodiments, this separation may reduce the transfer of heat from the heating element included in the melting component 44 to the surfaces of the first compartment 11 with which the user may come into contact. As mentioned, the distance between the channel opening 40 and the nozzle opening 42 may be based on a standard length of a wax stick provided for use with the device 10. In one embodiment, this distance may also be optimized based on the safety concerns discussed above. Additionally, because the melting component 44 may be suspended within the second compartment 12 by the support element 48, the melting component 44 may also be separated from the surfaces enclosing the second compartment 12 with which the user may also come into contact. Thus, the melting component 44 may be isolated in such a way as to minimize the risk of a heat-related injury that might be caused by the transfer of heat from the heating element to the exterior surfaces of the device 10 with which the user may come into contact.

Additionally, in some embodiments, a separation between the top surface 20 of the second compartment 12 and the melting component 44 may be configured to permit user viewing of the wax stick 56 as it progresses through the melting component 44. In other words, in embodiments where the nozzle is directly adjacent to the top surface 20 of the second compartment 12, the transfer of the wax stick 56 to the melting component 44 and the subsequent melting of the wax stick 56 may not be visible to viewers. In embodiments where there is a separation between the top surface 20 and the melting component 44, however, the transfer and subsequent melting of the wax stick 56 may be viewable.

In further embodiments, the support element 48 is repositionable with respect to the top surface 20 of the second compartment 12. Because the melting component 44 may be coupled to the support element 48, repositioning the support element 48 may provide customizable views of the melting component 44. For example, if a user is relatively short, the support element 48 may be lowered such that the user can observe the melting of the wax stick 56. Similarly, if a user is relatively tall, the support element 48 may be raised such that the user can comfortably observe the melting of the wax stick 56 without having to bend down. Additionally or alternatively, a user may wish to view the melted portions of the wax stick as it drips out of the nozzle tip 66. The support element 48 may be raised or lowered accordingly. Furthermore, in some embodiments, the support element 48 may be repositioned in order to vary the collection rate and/or timing of melted wax by a crayon mold. In embodiments, the support element 48 may be automatically repositioned during the melting and molding cycle in order to automatically provide such variations. In embodiments, the device 10 is configured such that the support element 48, and the melting component 44 that may be coupled thereto, is separated from the bottom surface 18 of the first compartment 11 by at least a threshold distance. Such configuration may be related to the safety concerns discussed above.

Figure 2:
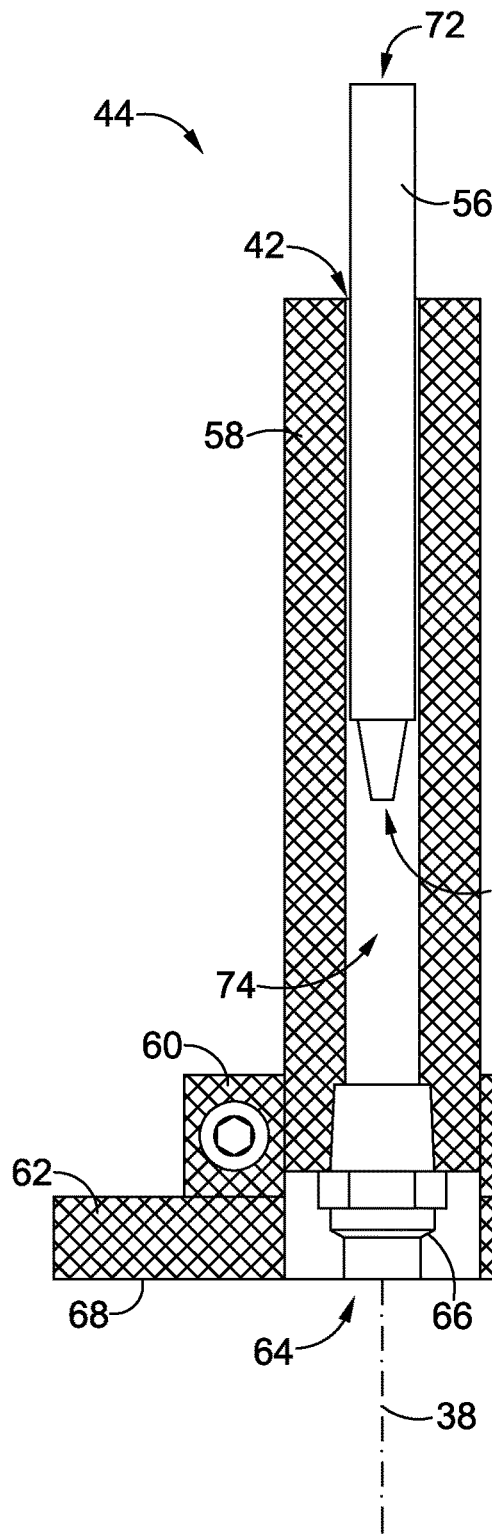
FIG. 2 is a cross-sectional view of a nozzle of the melting and molding device of FIG. 1, in accordance with an embodiment of the invention.

As shown in the embodiment of FIG. 2, a melting component 44 may include one or more heating element features that melt a wax stick 56 retained within the interior 74 of the melting component 44. As such, in one embodiment, a cylindrical first portion 58 may be coupled to a first channel of the melting component 44 for receiving the wax stick 56 at the nozzle opening 42. In further embodiments, the first portion 58 is coupled to a second portion 60 of the heating element, which provides additional melting heat to the wax stick 56 as it travels through the melting component 44. Still further, the second portion 60 may be coupled to the third portion 62 while the wax stick 56 continues to progress towards the nozzle front 64. In one embodiment, as shown in the example of FIG. 2, the third portion 62 includes a recessed portion of the nozzle front 64 where the nozzle tip 66 resides. As such, in some embodiments, the nozzle tip 66 may be recessed from a front surface 68 of the third portion 62. In one embodiment, heat conducted by and/or transmitted through the front surface 68 of the third portion 62 may be utilized by the device 10 for preheating of one or more molding features within the third compartment 14, as further discussed below.

As mentioned, after processing at the melting component 44, melted portions of the wax stick 56, such as droplets of melted wax, may be transferred from the nozzle tip 66 of the nozzle to the third compartment 14 through the second compartment opening 46. In embodiments, a gravitational pull may assist such transfer. Additionally or alternatively, an acceleration mechanism may provide an increased rate of transfer from the nozzle front 64 of the melting component 44 to the third compartment 14. In embodiments, the second compartment opening 46 may be configured to allow the transfer of melted portions of the wax stick 56 to the third compartment 14 and/or to enable a user to view at least a portion of the molding component included in the third compartment 14. In one embodiment, the size of the second compartment opening 46 may be optimized based on providing a view of the molding component and/or preventing the melted portions of the wax stick 56 from splattering back into the second compartment 12.

In some embodiments, one or more features of the third compartment 14 may be repositionable with respect to the first compartment 11 and the second compartment 12. In embodiments, the third compartment 14 is repositionable along the axis x with respect to the first compartment 11 and the second compartment 12. For example, the third compartment 14 may be slidably repositionable. In embodiments, one or more components of the third compartment 14 may be supported in a drawer. Other means of repositioning the third compartment 14 are included within the scope of this invention. In FIG. 1, the third compartment 14 is in a closed position, while in FIG. 3, the third compartment 14 is in an open position.

In embodiments of the invention, a second lighting component 52 may indicate a state of the third compartment 14. In one embodiment, a raising and lowering component of the third compartment 14, as well as a chilling component, may be associated with the third compartment 14, as further discussed below with reference to FIGS. 6A-6C.

As illustrated in FIG. 1, in embodiments, the first compartment 11 and the second compartment 12 are characterized by a cylindrical configuration. In one embodiment, the first compartment 11 may have a top surface 16 and a bottom surface 18, and the second compartment 12 may have a top surface 20 and a bottom surface 22. Also as illustrated in FIG. 1, the first compartment 11 and the second compartment 12 may be positioned directly adjacent to one another, while the second compartment 12 and the third compartment 14 may be adjacent to one another, but may be separated by some other surface or element such that the two are not directly adjacent to one another. With respect to the directly adjacent positioning of the first compartment 11 and the second compartment 12, a bottom surface 18 of the first compartment 11 may be coupled to a top surface 20 of the second compartment 12 according to one embodiment of the invention. In some embodiments, the bottom surface 18 of the first compartment 11 and the top surface 20 of the second compartment 12 are surfaces of the same element. The exemplary embodiment of FIG. 1 illustrates a device 10 in which the first compartment 11 and the second compartment 12 are vertically adjacent to one another, but in further embodiments, the first compartment 11 and the second compartment 12 may be aligned in other configurations, such as a horizontal, diagonal, or other alignment configured to provide a melting and molding device. For example, if the first compartment 11 and the second compartment 12 are horizontally adjacent to one another, a wax stick 56 may be transferred from the channel 26 through the channel opening 40 via an advancing mechanism, such as an advancing mechanism coupled to a source of compressed air, such that the wax stick 56 travels along a horizontal path to the nozzle opening 42. Similarly, any number of configurations and/or manners of alignment is contemplated as falling within the scope of the present invention.

It will be understood that although FIG. 1 illustrates a single channel 26 and a single nozzle opening 42, embodiments of the present invention may be configured for use with any number of wax sticks 56. Thus, embodiments of the device 10 may include one or more channels and a corresponding number of nozzles and/or nozzle openings at a melting component. Additionally, in some embodiments, a single channel, such as channel 26, may be configured to receive multiple wax sticks 56.

Turning now to FIG. 3, a front, perspective view of an embodiment of the device 10 with the third compartment 14 in an open position is illustrated, as well as an exploded view of the components that may be included in the third compartment 14, in accordance with an embodiment of the invention. As mentioned, in some embodiments, the third compartment 14 is slidably repositionable with respect to the first compartment 11 and/or the second compartment 12. As shown in the example of FIG. 3, the third compartment 14 has been slidably repositioned to an open position, such that the interior of third compartment 14 is accessible to a user. In embodiments, the third compartment 14 houses an anchor plate 76 coupled to a chilling mechanism 78 for chilling the mold plate 49 secured by the anchor plate 76. In one embodiment, the chilling mechanism 78 is configured to provide a cooling treatment to the mold plate 49 based on one or more methods of cooling. As such, a mold 50 formed within the mold plate 49 may be cooled within the mold plate 49, and may be subsequently removed by a user upon cooling. In the example of FIG. 3, the exploded view of the mold plate 49 and anchor plate 76 depicts a raised mold plate 49 such that the chilling mechanism 78 may be viewed. In embodiments, upon completion of a melting and molding process by a user, the mold plate 49 may be accessible via an open third component 14, with the mold plate 49 secured by the anchor plate 76.

Figure 4:
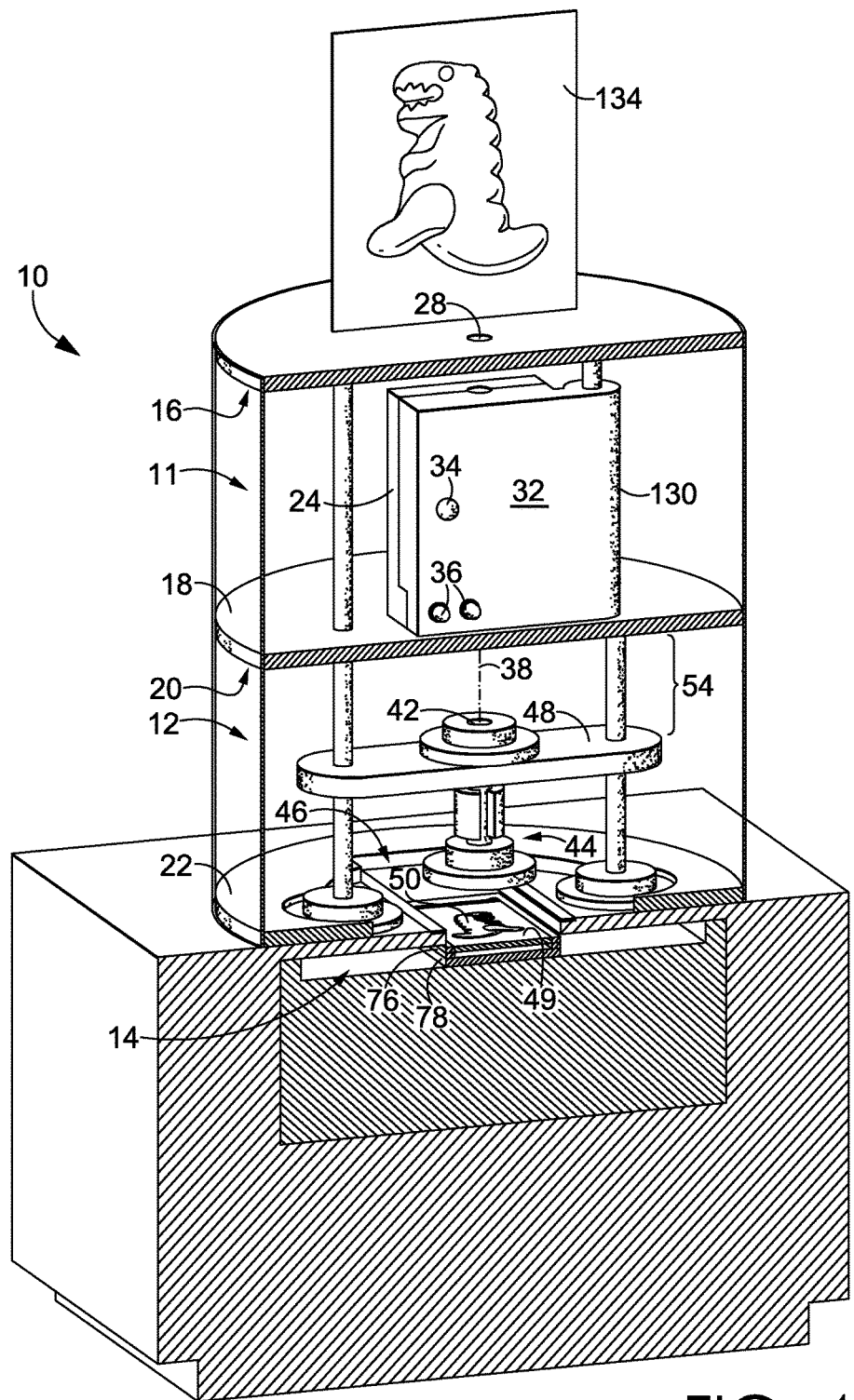
FIG. 4 is a cross-sectional view of a melting and molding device, in accordance with an embodiment of the invention.

In the embodiment of FIG. 4, a portion of the device 10 is cut away to reveal the components of third compartment 14 in association with the adjacent components within the second compartment 12. As such, one or more of the features of the third component 14 may be visible to a user operating the first and second compartments 11 and 12. In embodiments, the third compartment 14 additionally includes another access point, such as a door, through which a maintenance operator may further access various components of the device 10.

In one embodiment of the invention, a motor component is coupled to the anchor plate 76 and/or the mold plate 49. As such, in one embodiment, the anchor plate 76 (securing a mold plate 49) and/or the mold plate 49 may be coupled to a motor component for raising and lowering of the mold plate 49. In one embodiment, during preheating of the mold plate 49, the heated third portion 62 of the melting component 44 is brought into contact with the mold plate 49 based on raising of the mold plate 49, for generating and/or transferring an amount of heat to the mold plate 49. As such, one or more mold features of the mold plate 49 may be used to preheat the mold 50 for receiving melted wax.

As further shown in the cross-sectional view of FIG. 4, the melting component 44 may be aligned with the anchor plate 76, mold plate 49, and/or mold 50 when the third compartment 14 is in a closed position. In embodiments, the nozzle tip 66 of the melting component 44 nozzle is aligned with a center portion of the mold 50. Thus, when melted portions of the wax stick 56, such as droplets of melted wax, are transferred from the nozzle tip 66 of the melting component 44 through the second compartment opening 46 to the third compartment 14, the droplets may fall on a mold 50 surface of a mold plate 49 provided within the third compartment 14 and/or secured by the anchor plate 76.

In some embodiments, melted droplets of wax contact the mold 50 of the mold plate 49 and begin to fill the features and/or form of the mold 50 image. In one embodiment, the mold plate 49 is preheated by the melting component 44, based on contacting of the mold plate 49 with the third portion 62 of the melting component 44. As such, the image and/or features of the mold 50 may be preheated and/or prepared for contact between the warmed mold 50 surface with the melted/hot wax portions received thereon. In embodiments, preheating of the mold 50 and/or mold plate 49 to at least a threshold temperature provides a consistent contact surface for the melted wax received by the mold 50 and/or mold plate 49. As such, embodiments of the preheated mold 50 may be used to generate a molded crayon body 82 having a consistent surface corresponding to that of the intended surface design of the mold 50. For example, whereas a "cool" mold 50 may produce an uneven surface on a molded crayon body 82 (i.e., an "alligator skin" effect on the generated molded crayon), a preheated mold 50 and/or mold plate 49 may reduce the likelihood of such surface imperfections by enabling the mold 50 to reach a threshold temperature prior to receiving the melted wax. In other words, the preheated mold 50 may, in some embodiments, optimize the likelihood that the received melted portions of wax are accurately received by the mold 50, and collected and/or molded into the molded crayon body 82.

Embodiments of the device 10 may be configured to provide a safe and intuitive user experience such that a wide variety of users, including small children, can interact with the device 10 with minimal assistance. In embodiments, the lighting components associated with the device 10 may assist in creating this safe and intuitive user experience. As discussed above, the first lighting component 36 may be provided to a user to indicate when the covering component 32 may be moved by a user, for insertion of a wax stick 56. As further mentioned above, the second lighting component 52 may indicate a state of the third compartment 14. In one embodiment, such states may include a locked and unlocked state. In one embodiment of the invention, an electromagnetic lock, such as that described with respect to the lock on the covering component 32, may be used to implement the locked and/or unlocked states of the third compartment 14. With respect to the second lighting component 52, in some embodiments, a green light may indicate that the third compartment 14 is unlocked and ready to be opened by a user for retrieval of a molded crayon. In further embodiments, a red light displayed by the second lighting component 52 may indicate that the melting and molding process is in progress, and that the third compartment 14 is therefore locked. As discussed with respect to the first lighting component 36, the second lighting component 52 may include one or more lighting elements that may or may not be configured to display various colors. In embodiments, the lighting elements of the second lighting component 52 may include LED lights or any other light source for illuminating at least a portion of the second lighting component 52.

In one embodiment of the invention, the first lighting component 36 and the second lighting component 52 may be used to indicate an order of operations to a user and ensure an efficient flow of user traffic at the device 10. This intuitive user experience and level of efficiency may be important when the device 10 is integrated into an exhibit and/or experience that is visited by a high volume of users, as efficiency will contribute to a high quality of user experience.

According to one embodiment of the invention, an exemplary order of operations of the device 10 may be as follows. A user may approach the device 10. The first lighting component 36 may be green, indicating that the cover 32 of the receiving and positioning component 24 is unlocked. A red light at the second lighting component 52 may indicate that the third compartment 14 is locked. One or more instructions may be provided to a user to indicate that when the cover 32 of the receiving and positioning component 24 is unlocked, the user should open the cover 32. The user may then open the cover 32 of the receiving and positioning component 24 and place a wax stick 56, such as a crayon body (e.g., an unwrapped crayon body, such as a Crayola® crayon), into the channel 26. The user may then close the cover 32. Upon closing the cover 32, a lock associated with the cover 32 may engage. The first lighting component 36 may display a red light to indicate that the cover 32 is locked and may not be opened until the current melting and molding cycle is complete. In one embodiment, upon closing and/or locking the cover 32, the melting component 44 may begin preheating the mold plate 49 based at least in part on raising and/or positioning the mold plate 49 adjacent the front surface 68 of the melting component 44 nozzle.

In one embodiment, when the cover 32 is closed, the melting component 44 may automatically begin to heat the received crayon body 56. The user may then watch the melting and molding process. In one embodiment, the melting component 44 begins heating the received crayon body 56 at the same time that the melting component 44 begins preheating the mold 50 of the mold plate 49, in preparation for receipt of melted wax. In embodiments, upon receiving an indication that a crayon body 56 is secured by the receiving and positioning component 24, and that the cover 32 is closed, the melting component simultaneously preheats the mold 50 of the mold plate 49 based on the third portion 62 of the melting component 44 being brought into closer contact with the mold plate 49. As such, in some embodiments, prior to the completion of melting of a portion of the crayon body 56, the mold 50 is preheated in preparation for receiving melted wax.

After a predetermined amount of time and/or an amount of time sufficient to preheat a particular mold 50 on a mold plate 49, the mold plate 49 may return to a resting position, separated a particular distance from the melting component 44, for receipt of portions of the melted wax. With the mold plate 49 resting within the anchor plate 76, the mold 50 may be aligned with the nozzle tip 66 such that most of the melted wax dispensed from the melting component 44 is received by the mold 50. In one embodiment of the invention, with the third compartment 14 in a locked state, the preheated mold 50 receives melted wax from the melting component 44, with the volume of the mold 50 shape configured to receive all of the melted wax corresponding to a single wax stick 56 received by the receiving and positioning component 24.

The predetermined amount of time for melting and molding a wax stick 56 into the mold 50 may be based on an amount of time associated with melting, dripping, and molding, as well as an amount of time for allowing the melted wax to cool on the mold plate 49. In this way, a release component may be coupled to the third compartment 14, where the release component is configured to activate or deactivate, such as locking or unlocking a lock, in response to a timing mechanism. In embodiments, the predetermined amount of time is approximately 3-5 minutes. In one embodiment, the timing mechanism allows enough time for the mold 50 of the mold plate 49 to be preheated (i.e., raised into closer proximity with the third portion 62, and lowered back into closer proximity with the anchor plate 76), the mold 50 to receive one or more portions of melted wax from the wax stick 56, and the mold plate 49 to completely cool the formed mold 50. In another embodiment, upon receipt of the melted wax by the mold 50, the mold plate 49 may be chilled by a chilling mechanism 78 associated with the third compartment 14. In one embodiment, one or more chilling features associated with the anchor plate 76 may be used to cool a molded crayon once the preheated mold 50 of the mold plate 49 has received all of the melted wax from a crayon body 56.

Upon completion of a cooling cycle (i.e., a timed interval during which the molded crayon body cools within the mold 50 using a chilling mechanism 78 coupled to the anchor plate 76), a user may open the third compartment 14. In one embodiment, the second lighting component 52 indicates to a user that the mold has completed a particular interval of cooling, and further indicates that the drawer of the third compartment 14 may be opened based on release of the locking mechanism. In another embodiment, the second lighting component 52 provides a further indication of progress, such as a countdown of a timer corresponding to the time of cooling of the melted wax within the mold 50. As such, in one embodiment, a user may view the gradual melting of the crayon body 56 through the melting component 44, followed by the gradual cooling of the collected, molded crayon within the mold 50, as monitored by a timing feature of the second lighting component 52. In one embodiment of the invention, the chilling mechanism 78 is configured to cool the surface of the anchor plate 76, mold plate 49, and/or mold 50 that may be potentially contacted by a user. As such, while the mold plate 49 and/or mold 50 is preheated to receive a particular amount of melted wax at a particular elevated temperature, once all wax is received by the mold 50, the temperature of the mold plate 49, the anchor plate 76, and/or the mold 50 may be returned to a safe temperature for user contact. In further embodiments, a locking mechanism coupled to the third compartment 14 is configured to retain the third compartment 14 in a stationary position until all wax is received and/or all chilling of the mold 50 and/or mold plate 49 is completed.

Upon retrieval of the molded crayon from the third compartment 14, a user may replace the drawer of the third compartment 14, thereby indicating to the device 10 that the first compartment is ready to receive a wax stick from a second user. In some embodiments, the first lighting component 36 may illuminate a particular color (green) to indicate to a user that the covering 32 may now be opened for inserting a next wax stick for molding. In some embodiments, based on unlocking and/or opening of the cover 32 within the first compartment 11, the third compartment 14 becomes locked, as indicated by one or more of the first lighting component 36 and the second lighting component 52.

The exemplary order of operations described above may not only promote efficiency, but may also promote safety and proper use of the device 10. For example, the locking and unlocking sequence described above may prevent a user from providing multiple wax sticks to the channel 26 during the melting and molding process. This may prevent a jam of wax sticks in the channel 26 or other portions of the device 10. This may also control the time a single user may spend at the device 10, as the user may be limited to interacting with a number of cycles corresponding to a number of wax sticks provided to the user. Additionally, if the user is required to open and close the third compartment 14 before a lock on the cover 32 is disengaged, a user may therefore be encouraged to remove their molded (and cooled) crayon body from the mold 50, and move on to another exhibit and/or display area rather than leaving a molded crayon on the mold plate 49 and attempting to melt additional wax into the third compartment 14.

It will be understood that the order of operations and associated locking, unlocking, preheating, cooling, and lighting scheme described above is an example of only one embodiment. Other schemes may be implemented at the device 10 using the locks, lighting, preheating, and cooling components. It will further be understood that the device 10 may include components in addition to those described above, or that the device 10 may include fewer components than those described above.

Figure 6B:
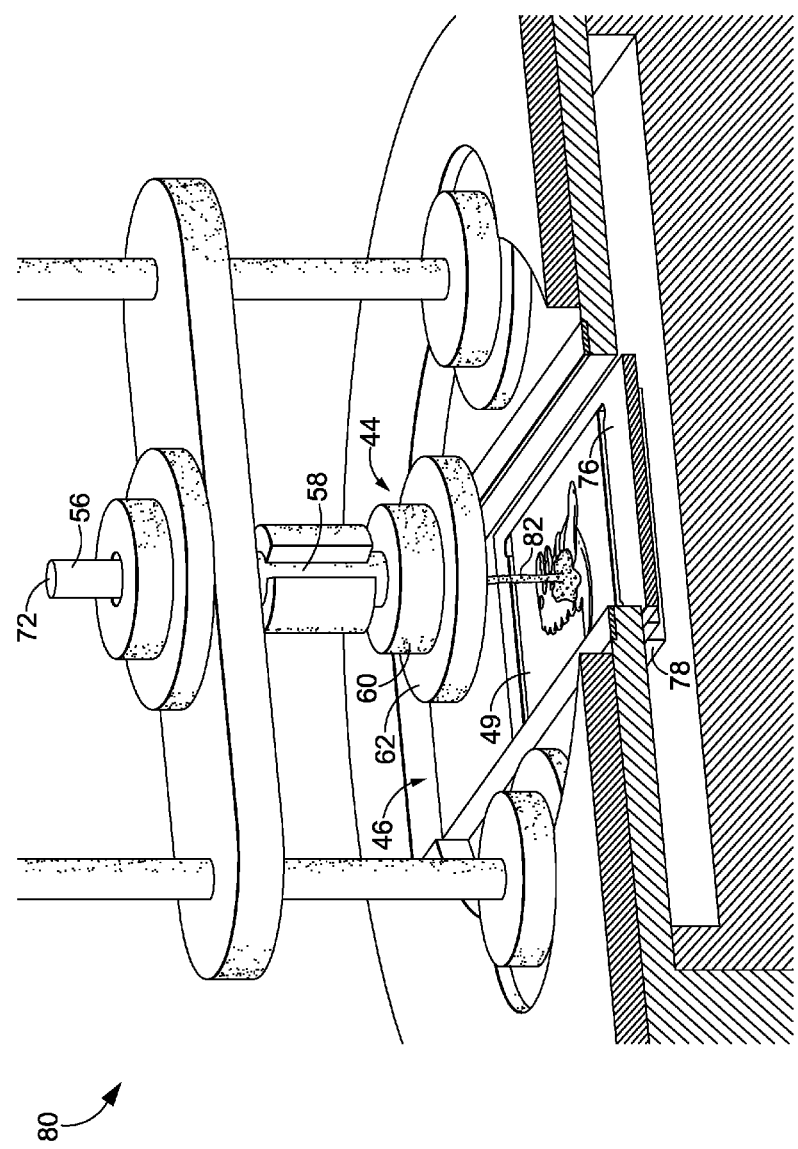
FIG. 6B is an enlarged, perspective view of portions of second and third compartments of a melting and molding device, with a mold plate in a lowered, filling position, in accordance with an embodiment of the invention.

Turning now to FIGS. 6A-6C, enlarged, perspective views 80 of second and third compartments 12 and 14 of a melting and molding device, are provided according to embodiments of the invention. As shown in FIG. 6A, mold plate 49 is shown in a raised, preheating position, during which the surface of the mold 50 and/or mold plate 49 is heated by the melting component 44 to provide a warmed and/or preheated surface for receiving melted wax from a wax stick 56. In the embodiment of FIG. 6B, the mold plate 49 is returned to a neutral position within the anchor plate 76, and is receiving melted portions of wax from a wax stick 56 being melted by the melting component. Subsequently, in the embodiment of FIG. 6C, melted wax is provided to a molded crayon body 82 being formed within the mold 50, and cooled using a cooling mechanism coupled to one or more features within the third compartment 14. As such, in some embodiments, a metallic and/or conductive surface previously heated for receipt of melted wax may now be cooled to a particular temperature, as shown in the example of FIG. 6C, such that the molded crayon body 82 is safe enough for retrieval by a user via the third compartment 14. In one embodiment, the molded crayon body 82 may be further removable from the mold 50 based on one or more surface treatments to the surface of the mold 50 and/or mold plate 49.

Figure 7:
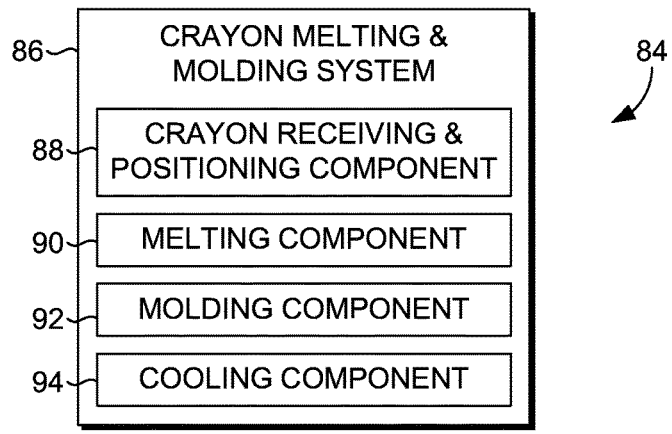
FIG. 7 is a block diagram of an exemplary system for melting and molding a crayon, in accordance with an embodiment of the invention.

Embodiments of the melting and molding device 10 may include one or more components of the system described with respect to FIG. 7. In embodiments, the exemplary environment of the system 84 in FIG. 7 may be used to create a molded crayon body 82. The system 84 may include a crayon melting and molding device 10 having a crayon receiving and positioning component 88 for receiving and positioning one or more wax sticks 56, such as the receiving and positioning component 24 discussed above. Embodiments of the system 84 further include a melting component 90 for melting the one or more wax sticks 56. In embodiments, the melting component 90 provides functionality similar to that provided by the melting component 44 discussed above, such as a feature on a front surface 68 for preheating at least a portion of a mold plate 49 and/or mold 50. In further embodiments, the system 84 includes a molding component 92, including such features as a mold 50, a mold plate 49, and/or an anchor plate 76. Finally, embodiments of the system 84 include a cooling component 94, such as the cooling mechanism 78 discussed above with reference to the third compartment 14. In one embodiment, the cooling component 94 may include any number of features designed to cool a mold 50 and/or mold plate 49 after receiving melted portions of wax. In one example, the cooling component 94 may include an amount of chilled air that circulates within at least a portion of the third compartment 14, while in further embodiments, the cooling component 94 includes a chilling mechanism 78 that is adjacent to the mold plate 49 when in a neutral position.

Figure 8:
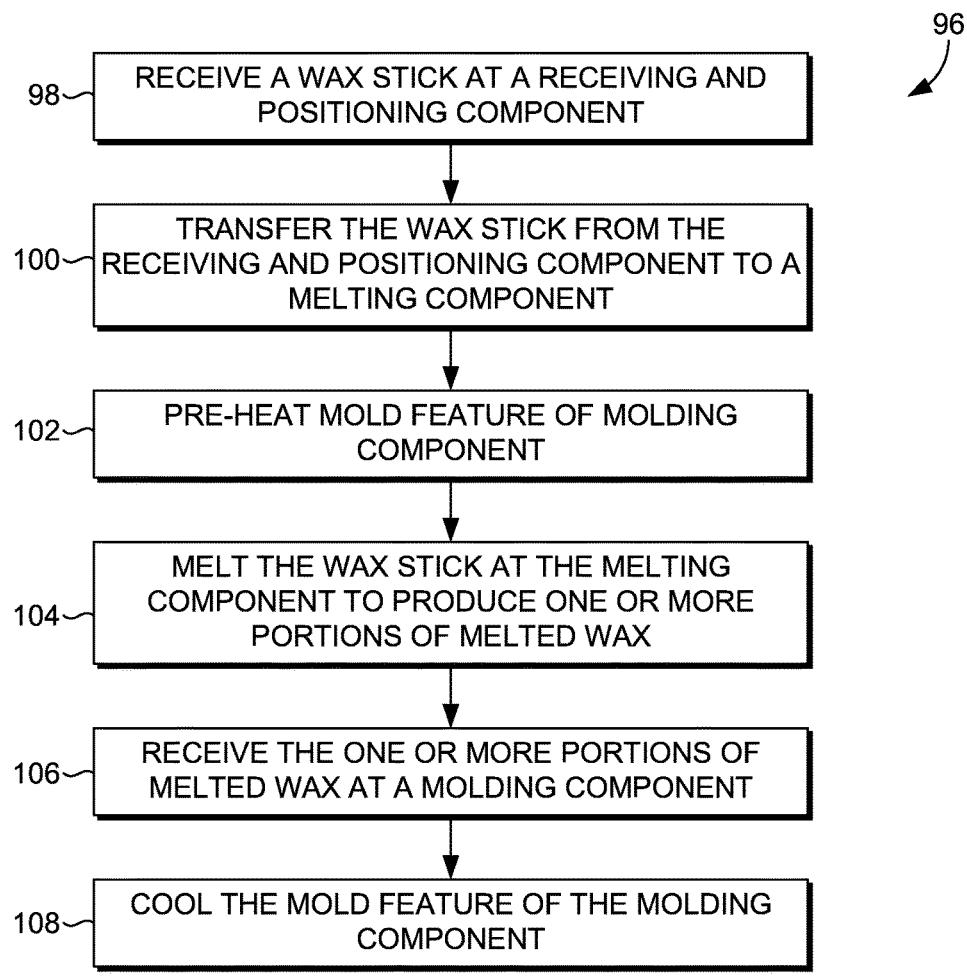
FIG. 8 is an exemplary flow diagram of a method for melting and molding a crayon, in accordance with an embodiment of the invention.

Turning now to FIG. 8, an exemplary flow diagram 96 including steps for creating a molded crayon body is provided. At block 98, a wax stick is received at a receiving and positioning component, such as a wax stick 56 received at a receiving and positioning component 24. Then, the wax stick is transferred from the receiving and positioning component to a melting component, at block 100, such as a transfer to the melting component 44 discussed above. At block 102, a mold feature of a mold component is preheated in preparation for receiving melted wax. In one embodiment, the melting component is configured to preheat the molding component. At block 104, the wax stick is melted at the melting component to produce one or more melted portions of melted wax. The one or more melted portions of melted wax are received at the (preheated) molding component at block 106. Finally, at block 108, a mold feature of the molding component is cooled.

Figure 9:
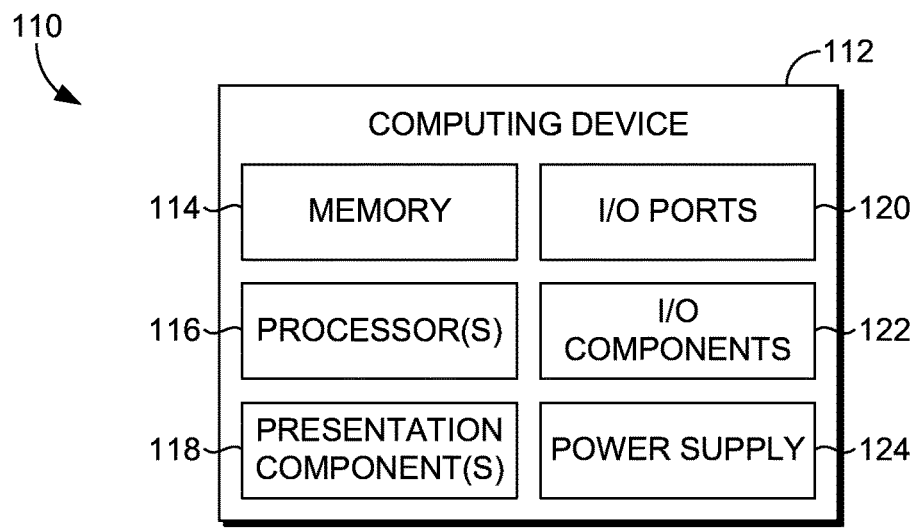
FIG. 9 is an exemplary computing device for use with a melting and molding device, in accordance with an embodiment of the invention.

Referring next to FIG. 9, an exemplary operating environment 110 in which embodiments of the present invention may be implemented is described below to provide a general context for various aspects of the present invention. Exemplary operating environment 110 includes a computing device 112, which is but one example of a computing environment for use with the present invention. The computing device 112 is not intended to suggest any limitation as to the scope of use or functionality of embodiments of the invention, and should not be interpreted as having any dependency or requirement relating to any one component nor any combination of components illustrated. In embodiments, the computing device 112 is coupled to the device 10 of FIG. 1 to provide various features discussed above.

Embodiments of the invention may be described in the general context of computer code or machine-useable instructions, including computer-useable or computer-executable instructions such as program modules, being executed by the computing device 112. The computing device 112 typically includes a variety of computer-readable storage media, which may be any available media that is accessible by the computing device 112, such as computer storage media that stores computer-executable instructions for execution by the computing device 112.

As shown in the example of FIG. 9, the computing device 112 may include the following components: a memory 114, one or more processors 116, one or more presentation components 118, one or more input/output (I/O) ports 120, one or more I/O components 122, and an illustrative power supply 124. The power supply 124 might include a rechargeable battery. As will be understood, the components of exemplary computing device 112 may be used in connection with one or more embodiments of the invention. In embodiments, the computing device 112 may include fewer components than those depicted in FIG. 9, or other components in addition to those depicted in FIG. 9.

Embodiments of the memory 114 include computer storage media in the form of volatile and/or nonvolatile memory that may be removable, non-removable, or a combination thereof. The computing device 112 may also include one or more processors 116 that read data from various entities such as the memory 114 or the I/O components 122. The presentation component(s) 118 may be configured to present data indications to a user or other device, such as a display device, speaker, printing component, vibrating component, lighting component, and the like. In further embodiments, the I/O ports 120 allow the computing device 112 to be logically coupled to other devices, while the I/O components 122 may include a camera, touch screen, microphone, joystick, game pad, satellite dish, scanner, printer, wireless device, and a controller, such as a stylus, a keyboard and a mouse, a natural user interface (NUI), and the like.

The I/O components 122 may include a temperature sensing and/or temperature control component for sensing and/or controlling a temperature of the heating element, such as a heating element coupled to the melting component 44, having a first portion 58, second portion 60, and/or third portion 62. For example, the rheostat and/or temperature controller discussed above may be one such I/O component. The I/O components may further include a cooling mechanism/component.

The processor 116 may be used to perform a variety of functions discussed with respect to various embodiments, including implementing a program for temperature control, implementing a locking and unlocking scheme such as that discussed above, implementing a lighting scheme such as that discussed above, activating or deactivating a release component at one or more of the compartments in response to a timing mechanism, implementing the variable heating and cooling features discussed above, or any other number of features. A reset button may be provided to reset the computing device 112 in the event the computing device 112 freezes and/or malfunctions.

Figure 10:
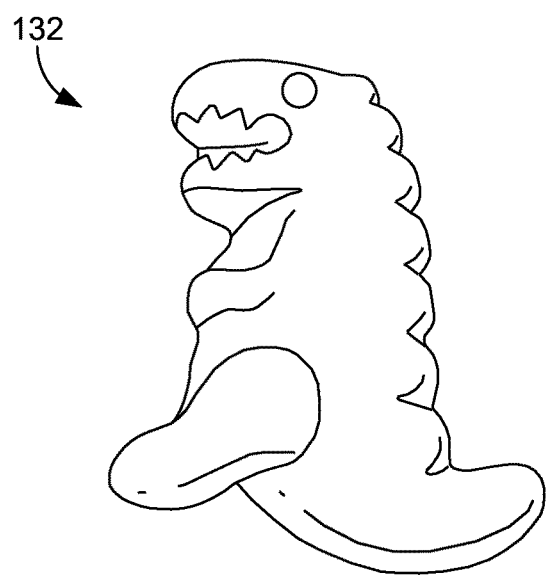
FIG. 10 is an exemplary molded crayon generated according to embodiments of the invention.

With reference to FIG. 10, a molded crayon body 132 is depicted according to an embodiment of the invention. In one embodiment, the molded crayon body 132 is created with melted portions of wax provided by a melting component of a melting and molding device, as collected by a preheated mold feature, and cooled with a chilling mechanism to produce a tangible and usable molded crayon body 132. In embodiments, the mold 50 corresponds to the shape of the molded crayon body 132 generated using the device 10, as discussed above. Further, an indication of an intended shape of a molded crayon body 132 may be depicted as part of the device 10, as shown in the display mold image 134 of FIG. 1.

Figure 11A:
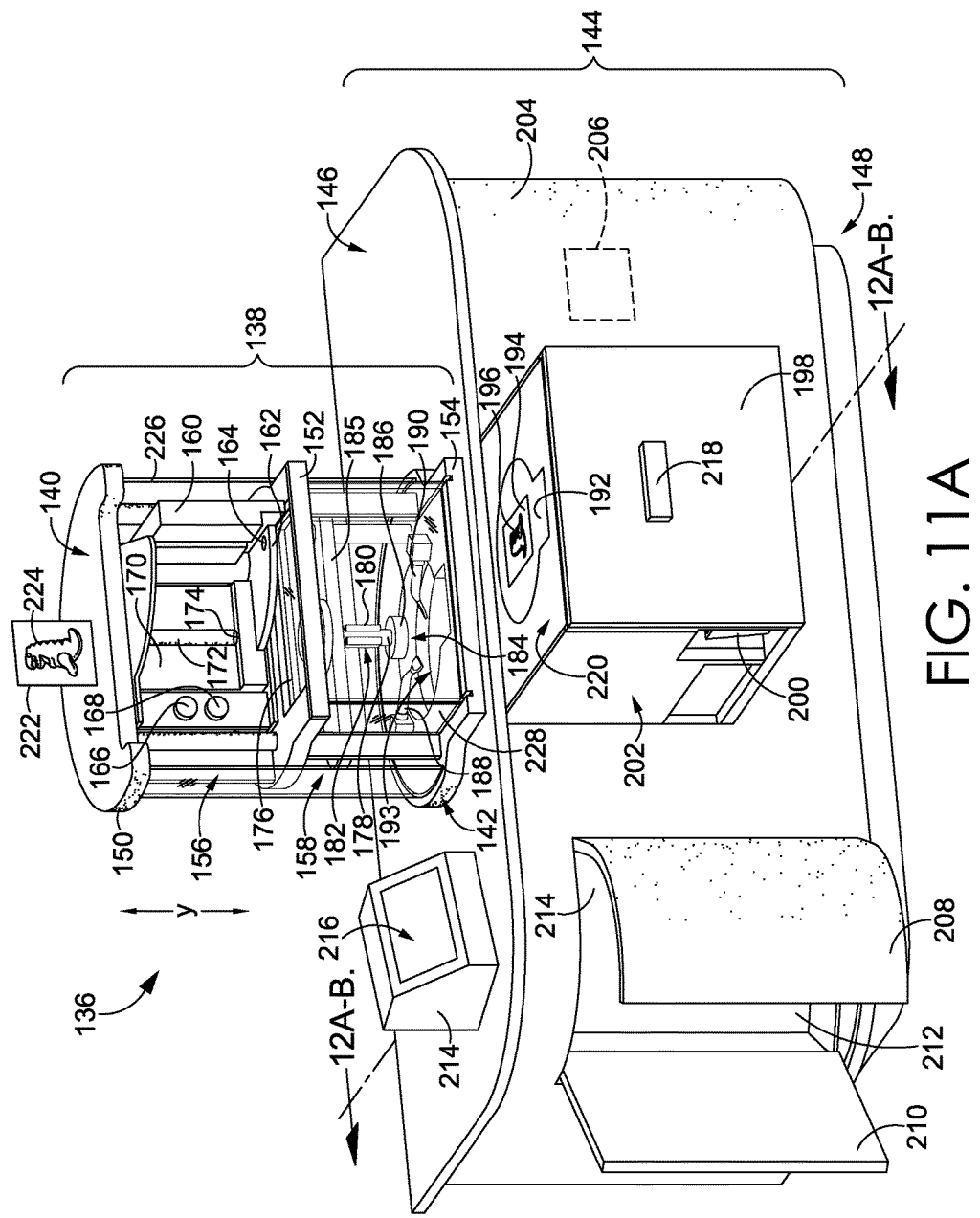
FIG. 11A is a front, perspective view of a melting and molding device, in accordance with an embodiment of the invention.

Turning now to the embodiment of FIG. 11A, a front, perspective view of a melting and molding device 136 includes an upper portion 138 and a lower portion 144 that include various components for melting and molding one or more crayon bodies. In the example of FIG. 11A, the upper portion 138 is oriented vertically along a y axis with an upper end 140 opposite a lower end 142, while the lower portion 144 is similarly oriented, having an upper end 146 and a lower end 148. In one embodiment, the lower end 142 of the upper portion 138 is adjacent the upper end 146 of the lower portion 144. As such, a crayon body and/or wax stick melted by one or more features of the upper portion 138 may be received by one or more features of the lower portion 144 for molding.

In the example of FIG. 11A, the upper portion 138 of the melting and molding device 136 includes a device top 150, a device middle 152, and a device bottom 154, which may be arranged in a variety of positions and/or orientations to provide an upper chamber 156 and a lower chamber 158. In some aspects, the upper chamber 156 is at least partially accessible to a user while the lower chamber 158 remains enclosed and/or protected from user access based at least in part on the vertical surround 226 that encloses at least a portion of the upper chamber 156 and lower chamber 158. As such, one or more features within the upper chamber 156 may be accessed via the partially open surround 226, providing access to the repositionable cover 160 having a drop plate 162 with a drop plate opening 164. In some aspects, additional or alternative features may be used in the melting and molding device 136 to control travel of a crayon body/wax stick through the device 136, such as the drop plate 162 having a drop plate opening 164, or a different type of travel stop that corresponds to opening and closing of the repositionable cover 160 of the receiving and positioning component 170.

In further aspects, as discussed in embodiments above, an indicator of progress may be provided to a user, based on a stage of melting and molding of the device 136, such as the light indicators 166 and 168, which may provide an indication to a user that the device 136 is ready to receive a wax stick. Additionally, embodiments of the receiving and positioning component 170 include a channel 172 with a channel opening 174 configured to receive a wax stick corresponding to the size and/or shape of the channel 172. For example, a standard-shaped crayon body may be positioned in the channel 172 and transferred from the upper chamber 156 to the lower chamber 158 based on passing through the channel opening 174.

In some embodiments, the device middle 152 may be used to separate the upper chamber 156 from the lower chamber 158, thereby providing an upper chamber 156 for receiving and positioning a wax stick and a lower chamber 158 to melt the wax stick for subsequent molding. In one embodiment, the device middle 152 includes a separating mechanism, such as a panel body or solid surface divider, for providing a barrier between the upper and lower chambers 156 and 158. Such a separating component may be a solid material that is transparent, semi-transparent, opaque, or a combination of varying features. In the embodiment of FIG. 11A, a viewing portion 176 of the device middle 152 provides viewing access to one or more melting and molding functions of the device 136. As such, the viewing portion 176 may be a transparent window on an otherwise opaque device middle 152. In another example, the outer edge of the device top 150 may be set back a distance from the outer edge of the device middle 152, thereby providing a user viewing access to a top surface of the device middle 152, and a top view of the melting and molding process being conducted within the lower chamber 158. In one embodiment, the vertical surround 226 meets with an extended portion 228 that projects towards the user, thereby adjusting a position of the viewing portion 176 away from the central axis y of the melting and molding device 136 and away from the travel path of the melting wax crayon.

With continued reference to the melting and molding process of the device 136, the lower chamber 158 may include a melting nozzle 178 coupled to a nozzle heater 180 having a thermocouple 182 for controlling and/or monitoring a melting temperature of the nozzle 178, a nozzle tip 184 for dispensing an amount of melted wax from within the melting nozzle 178, a nozzle support 185 for securing at least a portion of the nozzle 178 within the lower chamber 158, and a nozzle end 186 for preheating a mold. In one embodiment of the invention, the nozzle support 185 may position the nozzle 178 in alignment with the receiving and positioning component 170 of the upper chamber 156, such that an upper end and/or opening of the nozzle 178 is aligned to receive a wax stick and/or crayon body that drops vertically into the nozzle 178. In one aspect, the wax stick may be dropped into the nozzle 178 based on gravitational pull downward, while in another embodiment, the wax stick may be physically inserted into the upper end of the nozzle 178 such as by mechanical means. Based on the alignment of the channel 172 and the nozzle 178, a crayon may be received from a user accessing the upper chamber 156, and melted within the lower chamber 158 without the user having access to the heated features of the device 136, such as the nozzle 178.

Additionally, as viewed within the lower chamber 158, the device 136 may include one or more cooling features for accelerating the cooling phase of the molding process, such as a fan cooler for blowing air on or around the cooling mold plate 194. In the example of FIG. 11A, a first hose 188 and a second hose 190 are configured to provide air to the melting and molding device 136. In one aspect, the hoses 188 and 190 include a nozzle for directing air towards the mold plate 194 during cooling of the melted wax within the mold 196. Additionally, the one or more cooling features, such as the first hose 188 and the second hose 190, may be coupled to the device bottom 154 of the upper portion 138, such as by mounting blocks on the device bottom 154. Further, the device bottom 154 may include an opening 193 that provides access to the bottom chamber 198, for further molding and cooling by the device 136.

In the example of FIG. 11A, the lower portion 144 of the melting and molding device 136 includes additional features for processing the melted wax and molding it into a desired shape. In one embodiment, the lower portion 144 includes a bottom chamber 198 for molding, which may be provided as a drawer 202 removable from a base 204, with at least a portion of the interior portion 220 of the drawer 202 being accessible to a user. The drawer 202 of the bottom chamber 198 may include, in some embodiments, a removable tray 200 for storage and/or cleaning of excess wax associated with the molding process facilitated by the bottom chamber 198. Additionally, in further embodiments, the drawer 202 may include a handle 218 that is configured to allow or disallow access to the interior portion 220 of the bottom chamber 198.

The interior portion 220 of the drawer 202 may include one or more features for aligning with one or more components of the upper portion 138 of the melting and spinning device 136. For example, one or more mold features may be provided in association with the bottom chamber 198 that receive melted wax from the lower chamber 158 and molds the melted wax into a final product. As shown in the detail of FIG. 11A, embodiments of the interior portion 220 of the drawer 202 include a mold holder plate 192, a mold plate 194, and a mold 196 configured to receive one or more portions of melted wax from the melting and spinning device 136. As described above, in additional embodiments of the invention, the mold 196 may be filled with melted wax from the lower chamber 158, in response to a wax stick received by the upper chamber 156. Additionally, the mold holder plate 192 may be used to manipulate a position with respect to the interior portion 220 of the drawer 202, such as raising and lowering the mold plate 194 out of and into the bottom chamber 198. During a molding, a chilled mold 196 may be used to generate a molded crayon body corresponding to the mold design 224 depicted on the display 222 associated with the device 136.

In one embodiment of the invention, the base 204 includes a control component 206 configured to send and receive data to and from the melting and molding device 136. In one embodiment, the control component 206 is a controller configured to receive a signal from a thermocouple associated with the melting and molding device 136; determine a status of one or more of the upper chamber 156, the lower chamber 158, the bottom chamber 198, the nozzle 178, and other features of the device 136; and control user access to the receiving and positioning component 170 and/or user access to the drawer 202. Additional components associated with the device 136 may be included in and/or accessed from the base door 208 having a cabinet opening 210 that provides access to the interior cavity 212 of the base 204. Additionally, one or more features of the control display 214 may be accessed via the interior cavity 212, while details of the controls for the device 136 may be displayed on a screen, such as a touchscreen surface 216. As such, controlled, monitored, tracked, and/or scheduled features of the melting and molding device 136 may be interacted with via the touchscreen surface 216 as a user melts and molds a crayon.

Turning next to FIG. 11B, an enlarged, perspective view of portions of the melting and molding device is provided, which provides one example of a travel stop feature for variably controlling the travel of a wax stick 56 from the upper chamber 156 to the lower chamber 158, in accordance with an embodiment of the invention. In the embodiment of FIG. 11B, a trap door 256 is controlled to variably cover the opening 270 through the device middle 152, in response to extending or retracting of the plunger 264 coupled to the trap door 256 at the joint 262. In some embodiments, the plunger 264 is shifted between an extended and a retracted position in response to the coil drive 266 housed within the frame 268. The coil frame 268 may be coupled to a bottom surface of the device middle 152, and may include additional or alternative driving mechanisms that adjust a position of the plunger 264, and the corresponding position of the joint 262 and trap door 256. As shown in the example of FIG. 11B, the trap door 256 may be secured against the bottom surface of the device middle 152 by a trap door retainer 258 that positions and/or secures the trap door 256 with respect to the opening 270 during extending and retracting of the various travel stop features.

Figure 12B:
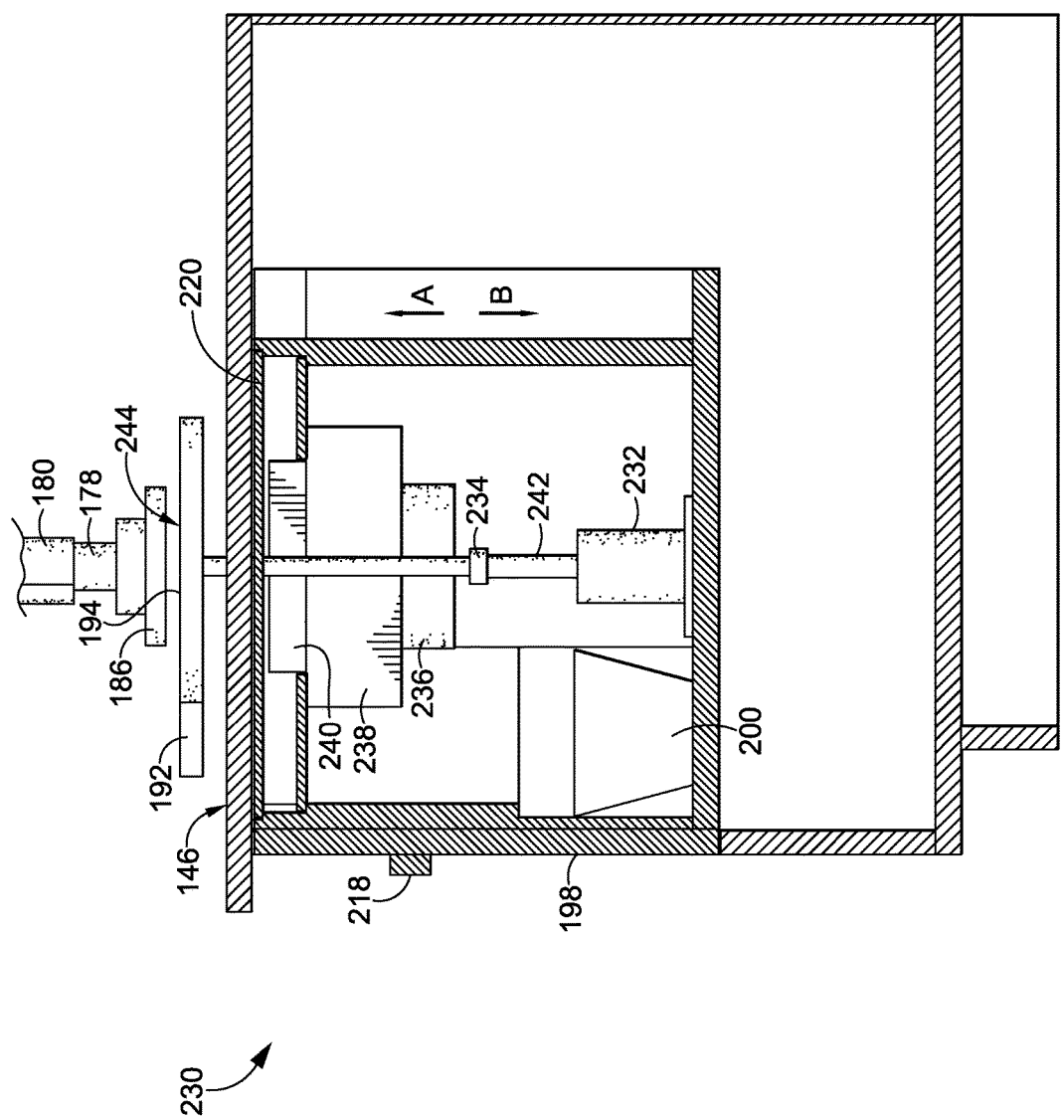
FIG. 12B is a cross-sectional side view of a bottom chamber of a melting and molding device, with a mold plate in a raised position, in accordance with an embodiment of the invention.

Turning now to the molding process carried out by the device 136, exemplary molding and cooling features of the melting and molding device 136 are included in FIGS. 12A-B, with a cross-sectional side view 230 of the lower compartment 144 that includes a mold holder plate 192 in a lowered position (FIG. 12A), and in a raised position (FIG. 12B). Embodiments of the lower compartment 14 include a lifting motor 232 coupled to a lifting bar 242, a support post 234, a fan 236, a cooling unit 238, and a chill plate 240 adjacent the mold holder plate 192 (that secures the mold plate 194 of the mold 196). Based on manipulation by the lifting motor 232, in one embodiment, the mold holder plate 192 may move in an upward direction A and in a downward direction B with respect to the interior portion 220 of the bottom chamber 198. As such, the raised mold holder plate 192 of FIG. 12B may be raised into closer proximity with the nozzle end 186 of the nozzle 178 for preheating of the mold 196 on the mold plate 194. Once the mold 196 is preheated to a particular temperature, the mold holder plate 192 may then be lowered to the position depicted in FIG. 12A, adjacent to the chill plate 240, to cool the mold 196.

Figure 13:
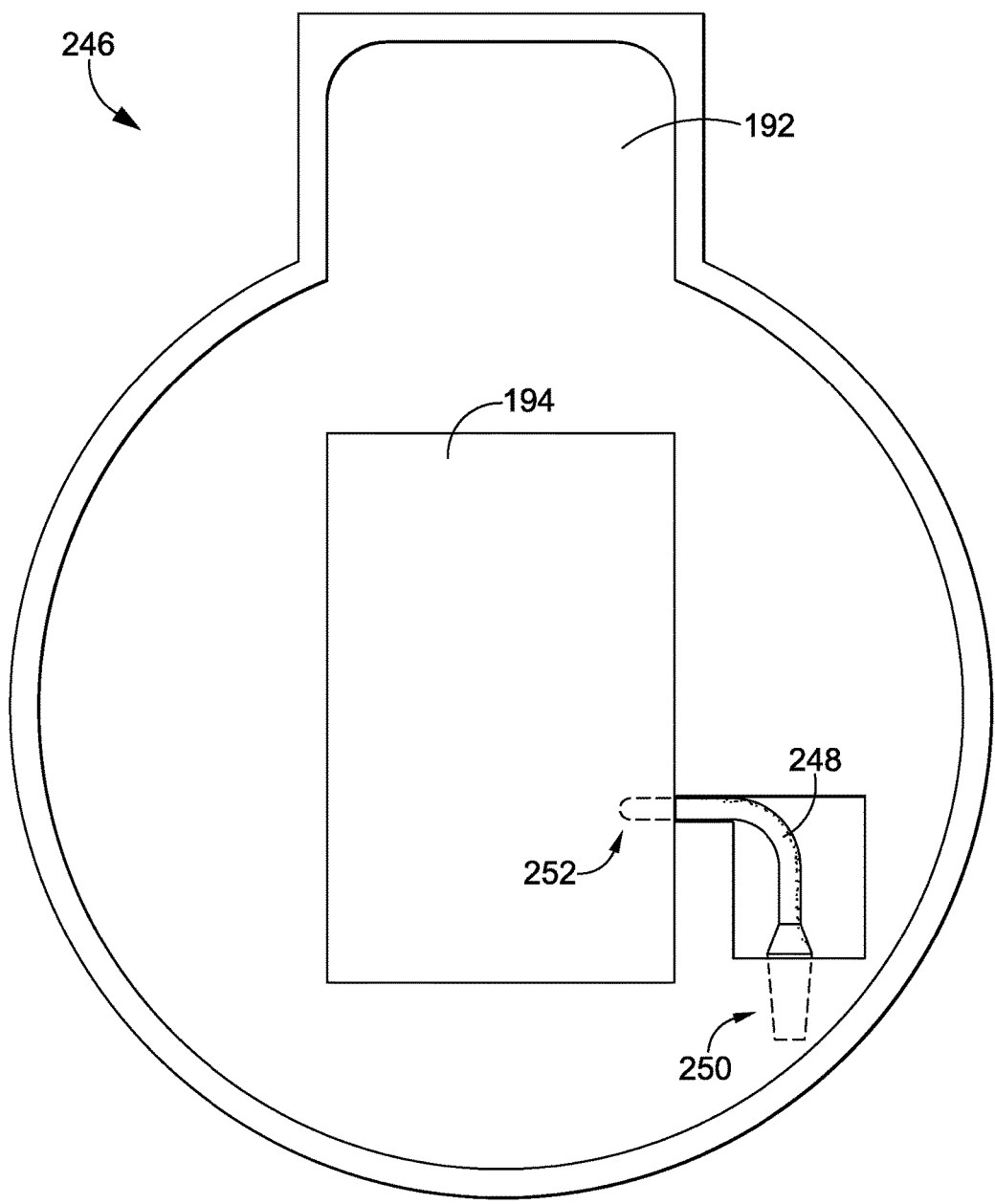
FIG. 13 is a bottom view of a mold holder plate that includes a mold plate and a thermocouple device, in accordance with an embodiment of the invention.

As shown in the bottom view 246 of FIG. 13, embodiments of the mold holder plate 192 may include a thermocouple component 248 coupled to the mold plate 194 for receiving temperature information and/or monitoring data from the mold plate 194 during the melting and molding process. In one embodiment, a first end 252 of the thermocouple 248 is coupled to the mold plate 194 secured by the mold holder plate 192, while a second end 250 of the thermocouple 248 may be coupled to one or more control components of the melting and molding device 136. As such, a preheated temperature of the mold 196 may be monitored, and a determination may be made that a mold is preheated to a particular temperature threshold prior to permitting the wax stick to proceed towards melting and dripping into the preheated mold. In another aspect, after the mold 196 has received the melted wax from the wax stick 56 (heated by the nozzle 178), the mold may be chilled by one or more cooling features associated with the bottom chamber 198. During such chilling, the temperature of the mold 196, mold plate 194, and/or mold holder plate 192 may be monitored by the thermocouple 248. As such, in one aspect, user access to the interior portion 220 of the bottom chamber 198 may be restricted until the mold 196 reaches a particular temperature, such as a temperature below a threshold level of safety for preventing burning upon user contact.

Figure 14A:
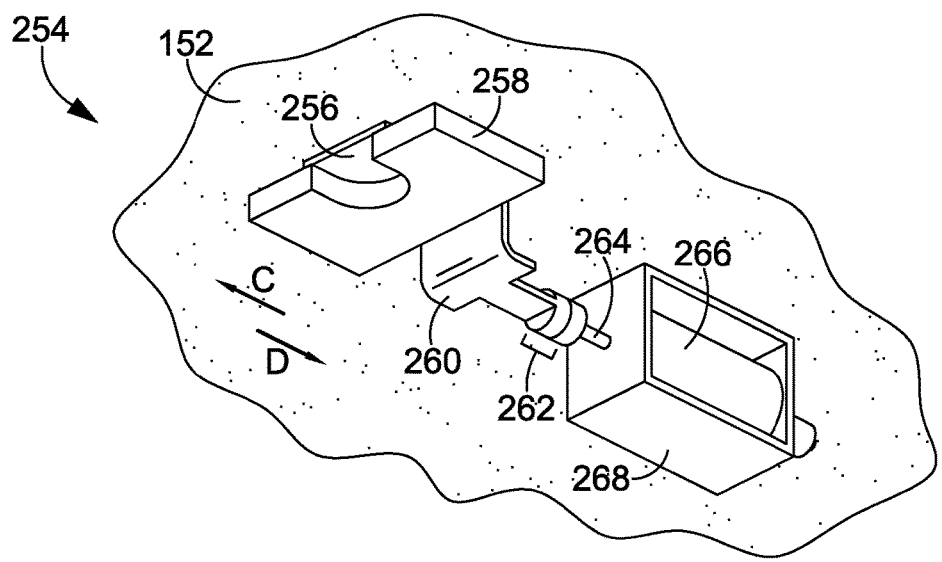
FIG. 14A is a bottom, perspective view of a travel stop feature for limiting travel of a crayon body through a melting and molding device, with a trap door mechanism in a closed position, in accordance with an embodiment of the invention.
Figure 14B:
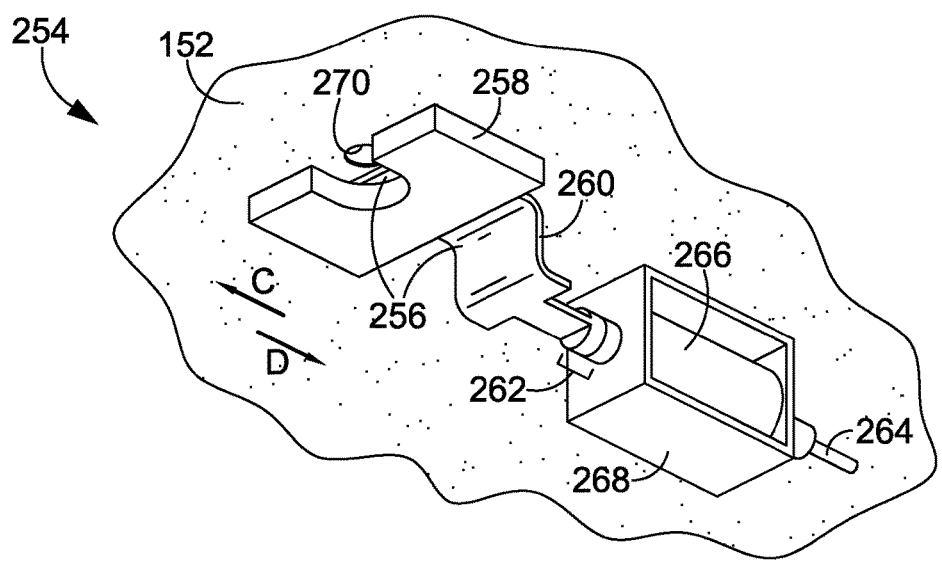
FIG. 14B is a bottom, perspective view of a travel stop feature for limiting travel of a crayon body through a melting and molding device, with a trap door mechanism in an open position, in accordance with an embodiment of the invention.

Referring next to FIGS. 14A-14B, a bottom view 254 of a travel stop and/or trap door mechanism for limiting travel of a crayon body through a melting and molding device 136 is provided, in accordance with an embodiment of the invention. In embodiments, the travel of the trap door 256 is adjusted from an extended position in a first direction C (e.g., FIG. 14A) to a retracted position in a second direction D (e.g., FIG. 14B). In further aspects, an angled portion 260 of the trap door 256 positions the trap door 256 against the device middle 152 (as secured by the trap door retainer 258) to disallow or allow travel through the opening 270. In one embodiment of the invention, a control component of the device 136 may be used to monitor a status of the preheated nozzle 178, a status of the mold holder plate 192, a status of the mold plate 194, a status of the mold 196, a position of the lifting bar 242, and/or a status of the drawer 202, to determine whether and when to permit user access to the upper chamber 156 and the bottom chamber 198.

Figure 15:
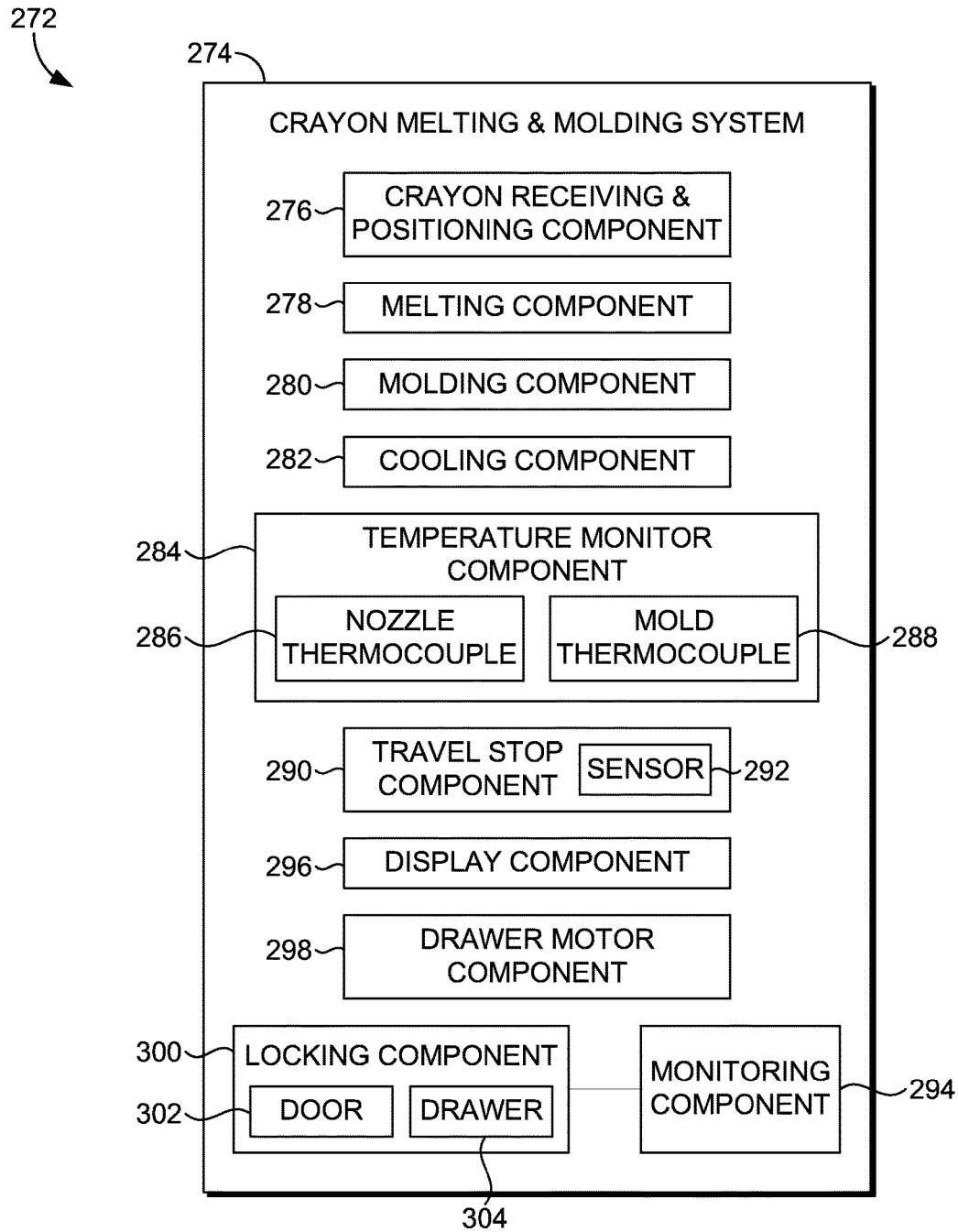
FIG. 15 is a block diagram of an exemplary system for melting and molding a crayon, in accordance with an embodiment of the invention.

Turning next to FIG. 15, a block diagram 272 of an exemplary system 274 for melting and molding a crayon is provided in accordance with an embodiment of the invention. In one embodiment of the invention, a crayon melting and molding system 274 includes a crayon receiving and positioning component 276, a melting component 278, a molding component 280, a cooling component 282, a temperature monitor component 284 having a nozzle thermocouple 286 an a mold thermocouple 288, a travel stop component 290 having a sensor 292, a display component 296, a drawer motor component 298, a locking component 300 having a door 302 and a drawer 304, and a monitoring component 294. As will be understood, in some embodiments, one or more components of the crayon melting and molding system 274 of FIG. 15 may be combined into single or multiple components that perform the same or similar functions as those described herein. As such, a function performed by one component described as a separate component in FIG. 15 may, in some embodiments, be included with additional features of additional described components and/or features of the system 274. For example, while the drawer motor component 298 is displayed as a separate component in FIG. 15, the lifting features of the drawer motor component 298 (e.g., raising and lowering the mold holder plate 192 for preheating and/or chilling the mold 196 of the mold plate 194) may be included with, coupled to, and/or incorporated as part of the features associated with the molding component 280, in one embodiment.

As described with reference to FIG. 11A, the crayon receiving and positioning component 276 may be configured to receive a wax stick for melting and molding by the system 274. This may include various features such as a cover and/or door that permits and prevents access to a channel for inserting and/or positioning the wax stick in a generally vertical position with respect to the upper chamber of the melting and molding system, such as the upper chamber 156 of the melting and molding device 136 of FIG. 11A. Prior to permitting the travel of the wax stick from the crayon receiving and positioning component 276 to the melting component 278, the temperature monitor component 284 may be configured to monitor one or more of the nozzle temperature of the melting component 278 via the nozzle thermocouple 286 and the mold temperature of the molding component 280 via the mold thermocouple 288. As such, the monitoring component 294 may receive one or more items of information from the temperature monitor component 284 for processing to determine when and whether to activate one or more features of the locking component 300, such as the door 302 and the drawer 304.

Based on the determination of whether to lock and/or unlock access to one or more of the door 302 and the drawer 304, the travel stop component 290 may engage or disengage one or more features of the melting and molding system 274 based on one or more items of information, such as the nozzle temperature monitored via the nozzle thermocouple 286. In one embodiment, a nozzle thermocouple 286 provides an indication of the temperature of the preheated nozzle in the lower chamber, while the travel stop component sensor 292 detects the presence of a wax stick and maintains a closed "trap door" between the upper chamber and the lower chamber while the nozzle is heating to a threshold temperature. Accordingly, once the nozzle thermocouple 286 indicates that the nozzle temperature has reached a threshold preheating level, the travel stop component 290 may engage and/or disengage one or more features that permit travel of the wax stick from the upper chamber to the lower chamber. Similarly, a sensor on the receiving and positioning component 276 may be associated with the sensor component 292 of the travel stop component 290 for determining when a crayon is loaded into the receiving and positioning component 276, and determine a phase of a melting and molding cycle.

In addition to determining that a nozzle has reached a threshold temperature required for melting with the melting and molding system 274, an additional and/or alternative determination may also be made, in some embodiments, regarding preheating of the mold itself, such as the mold 196 of the mold plate 194. For example, the mold thermocouple 288 may monitor a mold temperature of the mold 196 to determine whether the mold 196 has reached a threshold temperature prior to receiving any of the melted wax from the melting wax stick in the lower chamber. As such, triggering of the travel stop component 290, controlling the transfer of the wax stick from the upper chamber to the lower chamber, may also correspond to the preheated temperature of the mold 196 (i.e., the temperature of the mold 196 preparing to receive the melted wax). In one aspect, the melting and molding system 274 is configured to activate one or more features of the system 274 based on a threshold temperature requirement of one or more features of the system 274, such as a minimum and/or maximum temperature threshold for melting the wax stick by the nozzle of the lower chamber, and/or a minimum and/or maximum temperature threshold for receiving the wax stick by the mold in the bottom chamber. For example, the threshold temperature for melting by the nozzle may be defined as a range of elevated temperatures of the nozzle features that is required to generate enough heat to melt an entire wax stick during a single cycle of the melting and molding system 274, while melting enough of the wax at a threshold rate such that scorching of the melted wax and/or clogging of the nozzle tip does not occur. In another example, the threshold temperature for molding by the mold 196 (i.e., for receiving melted wax by the mold 196) may be defined as a threshold minimum and/or maximum temperature required for receiving the melted wax at a particular melted temperature and cooling and/or molding the wax at a particular rate of cooling such that the exterior of the molded crayon body is preserved and/or protected from surface impairments due to a mismatch between the melted wax temperature and the preheated mold temperature. In one aspect, the mold plate 194 may be preheated to a particular temperature prior to receiving wax from the nozzle that is also preheated to a particular temperature, thereby providing a mold temperature corresponding to the monitored mold plate temperature and a nozzle temperature corresponding to the monitored nozzle temperature for ideal molding of the melted wax.

During processing of the various phases of preheating, melting, molding, cooling, and the like, the melting and molding system 274 may display one or more prompts on the display component 296 that correspond to a phase of the melting and molding cycle or other features of the crayon melting and molding system 274. For example, for an entertainment and/or activity exhibit that includes a crayon melting and molding system 274 for access by multiple users, the display component 296 may depict one or more illustrations corresponding to the melting and molding cycles for engaging interest of the users of the system 274. In another aspect, the display component 296 may generate and/or display one or more prompts to a user that correspond to one or more phases of the melting and molding cycle carried out by the system 274. For example, a first instance of a melting and molding process may require a first amount of threshold time to preheat the mold and/or preheat the nozzle for melting. In a second instance of operation, the melting and molding process may require a second amount of threshold time to preheat the mold and/or preheat the nozzle for melting. As such, in some embodiments, the display component 296 may display one or more predetermined timepoints and/or countdown mechanisms for a user to track the progress of the melting and molding system. In another embodiment, the display component 296 may display real-time activation of various features of the melting and molding system 274, such as the indication that the crayon receiving and positioning component 276 is open, unlocked, and/or ready to receive a wax stick and that the nozzle is preheated to an appropriate threshold temperature. In another embodiment, the display component 296 may receive an indication from the monitoring component 294 regarding the cooling of the mold plate, such as an indication that the mold plate has reached a threshold cooling temperature to provide a completed molded crayon body to the user, while safely providing user access to the bottom chamber as well.

Embodiments of the crayon melting and molding system 274 include a melting component 278 having a melting nozzle that is configured to receive the wax stick from the upper chamber of the system and melt the wax stick to a required and/or threshold temperature for producing liquefied droplets that travel through the nozzle of the lower chamber and into the mold of the bottom chamber of the system. The melting component's nozzle may include a nozzle body, a nozzle tip, and/or a nozzle end. In one embodiment, the nozzle body is coupled to a heating feature, such as a heating band around a body of the nozzle, as well as a thermocouple mechanism. As such, the upper body portion of the nozzle may transmit and/or conduct heat to the remainder of the nozzle, such as the tip and the nozzle end, to provide a distributed heat source for the melting mechanism.

After melting by the melting component 278, the molding component 280 is configured to receive the melted portions of the wax stick (i.e., the droplets of melted wax) for molding. In the embodiments discussed above, the mold 196 of the mold plate 194 may correspond to a particular crayon body configuration for a particular melting and molding system 274, such as a particular molded crayon exhibit for generating a particular molded crayon (e.g., the dinosaur of FIG. 11A). The mold plate 194 and/or mold 196 may be preheated for receiving melted wax, according to embodiments of the invention. In one aspect, the drawer motor component 298 is configured to raise the mold plate 194 in an upward direction to engage and/or position adjacent to the nozzle end, which in some embodiments includes a flattened heating surface for covering a majority of the surface of the mold 196. Such raising may be conducted for a threshold amount of time, such as an amount of time predetermined for preheating of the mold, according to one embodiment of the invention. In another embodiment, the mold thermocouple 288 may be used to determine whether the mold 196 is heated to a required temperature before lowering the mold plate 194 away from the nozzle end (i.e., in a downward direction).

Having received the melted wax of the crayon into the molding component 280, the cooling component 282 may be configured to accelerate the cooling of the melted wax and/or the preheated mold by activating one or more features of the melting and molding system 274. In one embodiment, blown air is passed over a top surface of the mold plate 194, so as to accelerate the cooling of the molded crayon body. In another embodiment, multiple blown air channels are provided for directing a cooling air force towards the cooling crayon body mold. In further aspects, the fan and/or cooling features of the bottom chamber may be utilized to cool at least a portion of the molded crayon body, such as a chilling plate adjacent the lowered mold plate. Based on monitoring by the mold thermocouple 288, in some embodiments, a real-time determination may be made as to whether the drawer of the bottom chamber may be opened to dispense the molded crayon body to a user.

Figure 16:
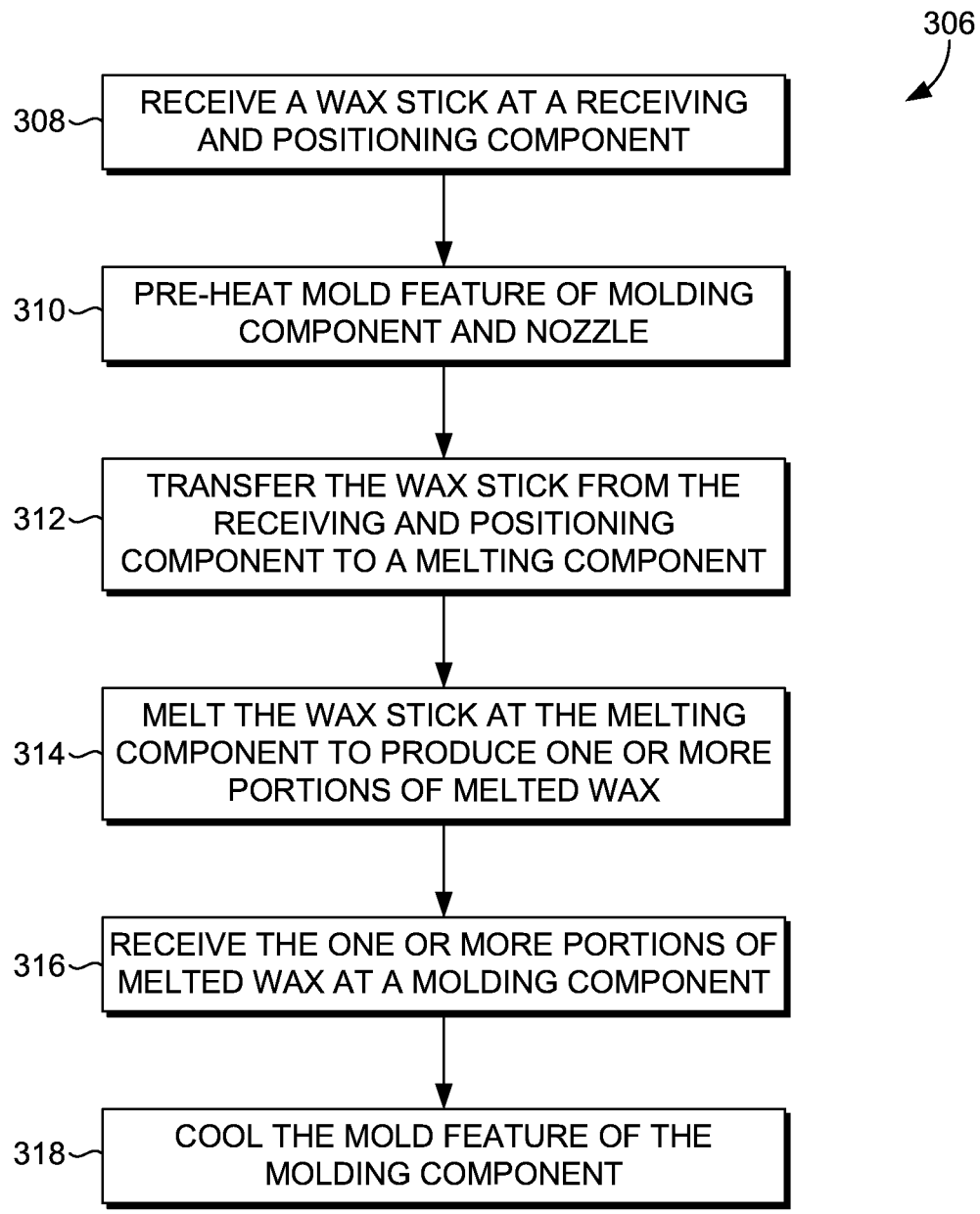
FIG. 16 is an exemplary flow diagram of a method for melting and molding a crayon, in accordance with an embodiment of the invention.

Referring finally to FIG. 16, an exemplary flow diagram of a method 306 for melting and molding a crayon is provided, in accordance with an embodiment of the invention. At block 308, a wax stick is received at the receiving and positioning component. Accordingly, the mold feature of the molding component, and the nozzle of the melting component, may be preheated at block 310.

As noted above, the instance of a transfer of the wax stick from the receiving and positioning component to the melting component, at block 312, may be determined based on both the preheated mold temperature and/or the preheated nozzle temperature. At block 314, the wax stick is melted at the melting component to produce one or more portions of melted wax (i.e., droplets of melted wax), while one or more portions of the melted wax is subsequently received at the molding component at block 316. In one embodiment, melted portions of wax are carried through the melting and molding system at a real-time and/or gradual pace to ensure consistent melting and molding of the final crayon body. Accordingly, at block 318, the mold feature of the molding component is cooled, thereby triggering the release of the drawer from the bottom chamber and permitting user access to the molded crayon body.

In one embodiment of the invention, the upper chamber lower chamber, and or bottom chamber of the melting and molding system and/or device may be configured as a modular unit that is removeable and/or replaceable with respect to one or more additional features of the melting and molding system/device. For example, a modular unit including the crayon receiving and positioning component and the crayon melting component may be combined into a single apparatus, may be provided of use with one or more bottom chamber units and/or bases. In another embodiment, one or more features of one or more chambers may be removable and/or replaceable, such as for maintenance of an interactive user exhibit including the melting and molding device. For example, the mold plate 194 may be a replaceable plate that can be removed and have a subsequent mold plate 194 inserted into the same mold holder plate 192. As such, a single exhibit may be interchangeably used to generate one of multiple different molds 196 based on changing out the mold plate 196. In one aspect, the mold plate 196 may be removable and/or replaceable via an interior compartment of the drawer and/or base, such that a user of the melting and molding device may not independently change the mold or alter the mold's position. For example, a device technician and/or authorized user may change the mold plate 196, while a device user melting and molding a crayon body is not permitted to remove the plate.

In another aspect, embodiments of the melting and molding device and/or the melting and molding system may be controlled dynamically and/or include dynamic timing of one or more features during the melting and molding process. For example, a dynamic control of preheating a nozzle temperature may include preheating the nozzle for a first threshold amount of time until the nozzle reaches a desired melting temperature, for a first user molding instance. At a subsequent/second user molding instance, the nozzle body may have already retained heat from a previous molding instance, and therefor require a shorter, second threshold amount of time to preheat the nozzle for the second molding instance, as compared to the first molding instance. In short, while the nozzle may be utilized for repeated and/or sequential melting and molding cycles, the threshold amount of time for preheating the nozzle may change, as the dynamic monitoring and/or use of the device provides an already preheated nozzle. Similarly, the threshold time for preheating the mold plate may change in response to multiple melting and molding processes. For example, a first instance of mold preheating may require a different amount of time than a second instance of mold preheating.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A melting and molding device for creating a molded crayon body, the device comprising:
    a first compartment comprising a receiving and positioning component that comprises a channel configured to receive and position a wax stick, wherein the first compartment is at least partially enclosed with respect to a user;
    a second compartment comprising a melting component, the melting component comprising a heating element, a nozzle opening, and a front surface, the nozzle opening configured to receive the wax stick, wherein the melting component is directly aligned with the channel of the receiving and positioning component, wherein the second compartment is substantially enclosed with respect to the user; and
    a third compartment comprising a molding component that includes a mold plate.

2. The melting and molding device of claim 1, wherein the first compartment is accessible to the user by a first compartment opening.

3. The melting and molding device of claim 1, wherein the receiving and positioning component includes a cover, the cover configured to permit or restrict user access to the channel.

4. The melting and molding device of claim 1, wherein one or more features of the third compartment are repositionable with respect to the first compartment and the second compartment.

5. The melting and molding device of claim 4, wherein the third compartment comprises a drawer that is accessible to the user.

6. The melting and molding device of claim 1, wherein a bottom surface of the first compartment is separated from the melting component of the second compartment by at least a threshold distance.

7. The melting and molding device of claim 1, wherein the melting component is coupled to a support element that is repositionable with respect to a top surface of the second compartment.

8. The melting and molding device of claim 1, wherein the first compartment and the second compartment are aligned along a central longitudinal axis.

9. The melting and molding device of claim 8, wherein a bottom surface of the first compartment is coupled to a top surface of the second compartment.

10. The melting and molding device of claim 1, wherein the melting and molding device further comprises a positioning mechanism configured to raise and lower at least one feature of the molding component.

11. The melting and molding device of claim 10, wherein the positioning mechanism is configured to raise at least one feature of the molding component into closer proximity with the front surface of the melting component.

12. The melting and molding device of claim 11, wherein raising the at least one feature of the molding component into closer proximity with the front surface of the melting component comprises raising the mold plate such that it is adjacent to the front surface of the melting component.

13. The melting and molding device of claim 1, wherein the device further comprises:
   a release component coupled to the third compartment, wherein the release component is configured to activate or deactivate in response to a timing mechanism.

14. The melting and molding device of claim 1, wherein the third compartment further comprises a cooling mechanism.

15. A system for creating a molded crayon body, the system comprising:
   a receiving and positioning component for receiving and positioning one or more wax sticks;
   a melting component for melting the one or more wax sticks to provide melted portions of the one or more wax sticks;
   a molding component for receiving the melted portions of the one or more wax sticks into a mold; and
   a locking mechanism coupled to one or more of the receiving and positioning component, the melting component, and the molding component.

* * * * *